US010875011B2

(12) United States Patent
Gopinath et al.

(10) Patent No.: US 10,875,011 B2
(45) Date of Patent: Dec. 29, 2020

(54) TEMPERATURE TUNABLE MESOPOROUS GOLD DEPOSITED CO OXIDATION CATALYST

(71) Applicant: Council of Scientific & Industrial Research, New Delhi (IN)

(72) Inventors: Chinnakonda Subramanian Gopinath, Maharashtra (IN); Edwin Solomon Raja Gnanakumar, Maharashtra (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 46 days.

(21) Appl. No.: 15/033,571

(22) PCT Filed: Nov. 3, 2014

(86) PCT No.: PCT/IN2014/000702
§ 371 (c)(1),
(2) Date: Apr. 29, 2016

(87) PCT Pub. No.: WO2015/063797
PCT Pub. Date: May 7, 2015

(65) Prior Publication Data
US 2016/0279612 A1 Sep. 29, 2016

(30) Foreign Application Priority Data

Nov. 1, 2013 (IN) .......................... 3238/DEL/2013

(51) Int. Cl.
*B01J 23/52* (2006.01)
*B01J 23/83* (2006.01)
(Continued)

(52) U.S. Cl.
CPC ............ *B01J 23/52* (2013.01); *B01D 53/944* (2013.01); *B01J 23/34* (2013.01); *B01J 23/63* (2013.01); *B01J 23/83* (2013.01); *B01J 35/00* (2013.01); *B01J 35/006* (2013.01); *B01J 35/0006* (2013.01); *B01J 35/0013* (2013.01); *B01J 35/1014* (2013.01); *B01J 35/1019* (2013.01);
(Continued)

(58) Field of Classification Search
CPC ... B01J 23/52; B01J 23/83; B01J 23/24; B01J 35/0006; B01J 37/04; B01J 37/345; B01J 37/009; B01J 23/63; B01J 35/00; B01J 35/0013; B01J 35/1014; B01J 35/1019; B01J 35/1038; B01J 35/1061; B01J 37/0018; B01J 37/0201; B01J 37/031; B01J 37/08; B01J 37/10; B01J 37/343; B01D 53/944
See application file for complete search history.

(56) References Cited

PUBLICATIONS

Hartridge et. al., Preparation and analysis of zirconia doped ceria nanocrystal dispersions, 2000, Journal of Physics and Chemistry of Solids, 63, 441-448.*

(Continued)

*Primary Examiner* — James A Fiorito
(74) *Attorney, Agent, or Firm* — Blank Rome LLP

(57) ABSTRACT

The present invention discloses a novel mesoporous gold deposited oxidation catalyst of formula: $XAu\text{-}M_{0.1}Ce_{0.85}Zr_{0.05}O_2$ wherein X=0.01-10%, M is selected from Cu, Co or Mn and process for the preparation thereof by photodeposition method.

17 Claims, 17 Drawing Sheets

(51) Int. Cl.
| | |
|---|---|
| B01J 37/02 | (2006.01) |
| B01J 35/10 | (2006.01) |
| B01J 35/00 | (2006.01) |
| B01J 37/00 | (2006.01) |
| B01J 23/63 | (2006.01) |
| B01J 37/34 | (2006.01) |
| B01J 37/10 | (2006.01) |
| B01J 37/08 | (2006.01) |
| B01J 37/03 | (2006.01) |
| B01D 53/94 | (2006.01) |
| B01J 23/34 | (2006.01) |
| B01J 37/04 | (2006.01) |

(52) U.S. Cl.
CPC ....... B01J 35/1038 (2013.01); B01J 35/1061 (2013.01); B01J 37/009 (2013.01); B01J 37/0018 (2013.01); B01J 37/0201 (2013.01); B01J 37/031 (2013.01); B01J 37/04 (2013.01); B01J 37/08 (2013.01); B01J 37/10 (2013.01); B01J 37/343 (2013.01); B01J 37/345 (2013.01); *B01D 2255/106* (2013.01); *B01D 2255/407* (2013.01); *B01J 2523/00* (2013.01)

(56) References Cited

PUBLICATIONS

Delannoy et al. Preparation of supported gold nanoparticles by a modified incipient wetness impregnation method, 2006, J. Phys. Chem. B, 110, 22471-22478.*

Zhao et al, Modern Inorganic Synthetic Chemistry, Elsevier, Chapter 8, 173-195 (Year: 2011).*

Chinchanop Pojanavaraphan, et al.; Catalytic Activity of Au—Cu/CeO2—ZrO2 Catalysts in Steam Reforming of Methanol; Science Direct; 2013; pp. 135-143.

Florian Huber, et al.; Preparation and Characterization of Nanocrystalline, High-Surface Area Cu—Ce—Zr Mixed Oxide Catalysts from Homogeneous Co-Precipitation; Chemical Engineering Journal; 2008; pp. 682-702.

Chinchanop Pojanavaraphan, et al.; Effect of Catalyst Preparation on Au/Ce1-xZrxO2 and Au—Cu/Ce1-xZrxO2 for Steam Reforming of Methanol; Science Direct; 2013; pp. 1348-1362.

Julio Cesar Vargas, et al.; Influence of Gold on Ce—Zr—Co Fluorite-Type Mixed Oxide Catalysts for Ethanol Steam Reforming; Journal Catalysts; 2012; pp. 121-138.

Eloy Del Rio, et al.; CO Oxidation Activity of a Au/Ceria-Zirconia Catalyst Prepared by Deposition-Precipitation with Urea; Top Catal; 2011; pp. 931-940.

M.C. Hidalog, et al.; Photodeposition of Gold on Titanium Dioxide for Photocatalytic Phenol Oxidation; Science Direct; 2011; pp. 112-120.

E.S. Gnanakumar, et al.; Mesoporous Cu0.1Ce0.85-xZrxO2: Possibility of Tuning CO Oxidation at Ambient Conditions; National Chemical Laboratory.

Donohue et al. "Classification of Gibbs adsorption isotherms", Advances in Colloid and Interface Science, 76-77 (1998) pp. 137-152.

Antony et al. "Effect of surface area, pore volume and particle size of P25 titania on the phase transformation of anatase to rutile", Indian Journal of Chemistry, Oct. 2009, pp. 1378-1382, vol. 48A.

Lu et al., "Cu-doped ceria: Oxygen vacancy formation made easy", Chemical Physics Letters, 2011, pp. 60-66, 510.

Mathew et al., $\gamma$-Al$_{2-x}$M$_x$O$_{3\pm y}$ (M=Ti$^{4+}$ through Ga$^{3+}$):potential pseudo-3D mesoporous materials with tunable acidity and electronic structure, J. Mater. Chem., 2012, pp. 13464-13493, 22.

Wang et al., "Unusual Physical and Chemical Properties of Cu in Ce$_{1-x}$Cu$_x$O$_2$ Oxides", J. Phys. Chem. B, 2005, pp. 19595-19603, 109.

Musa, Analysis of the Textural Characteristics and Pore Size Distribution of a Commercial Zeolite using Various Adsorption Models, Journal of Applied Sciences, 2011, pp. 3650-3654, vol. 11, 21.

\* cited by examiner

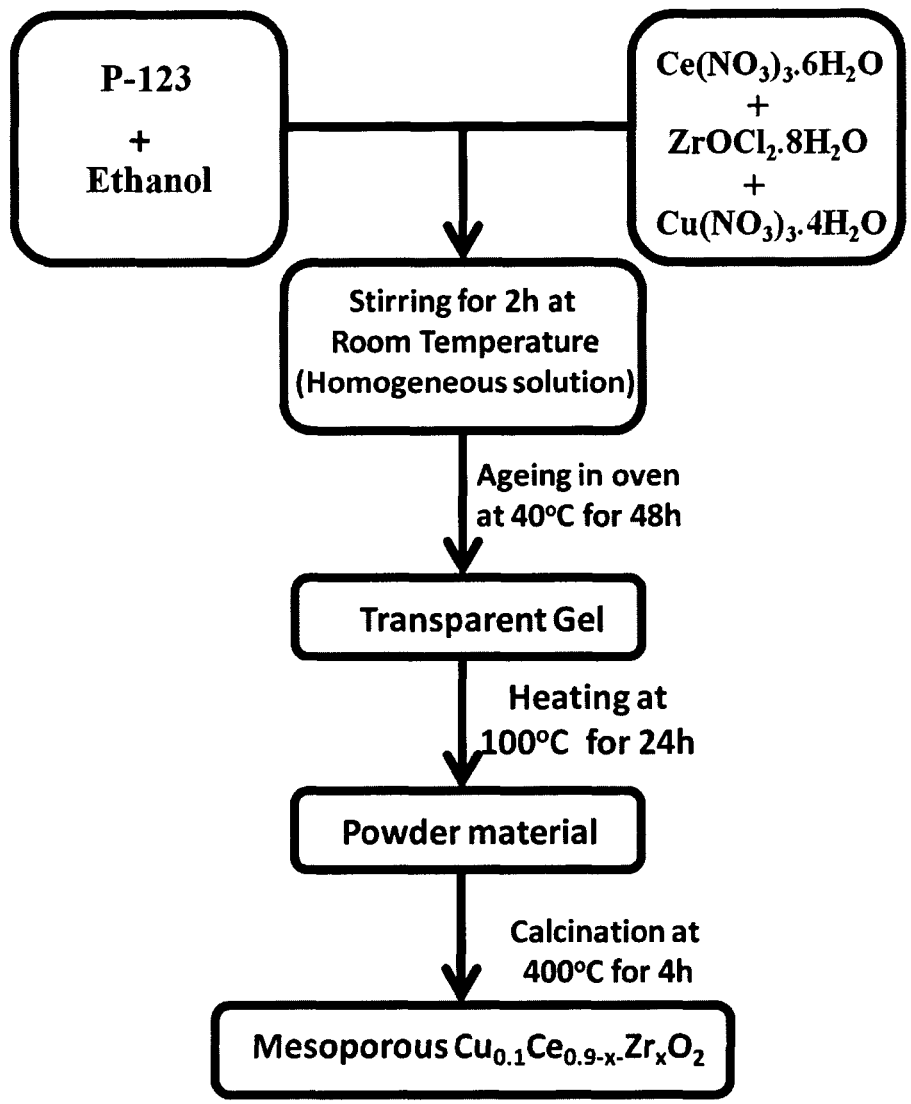
Fig: 1

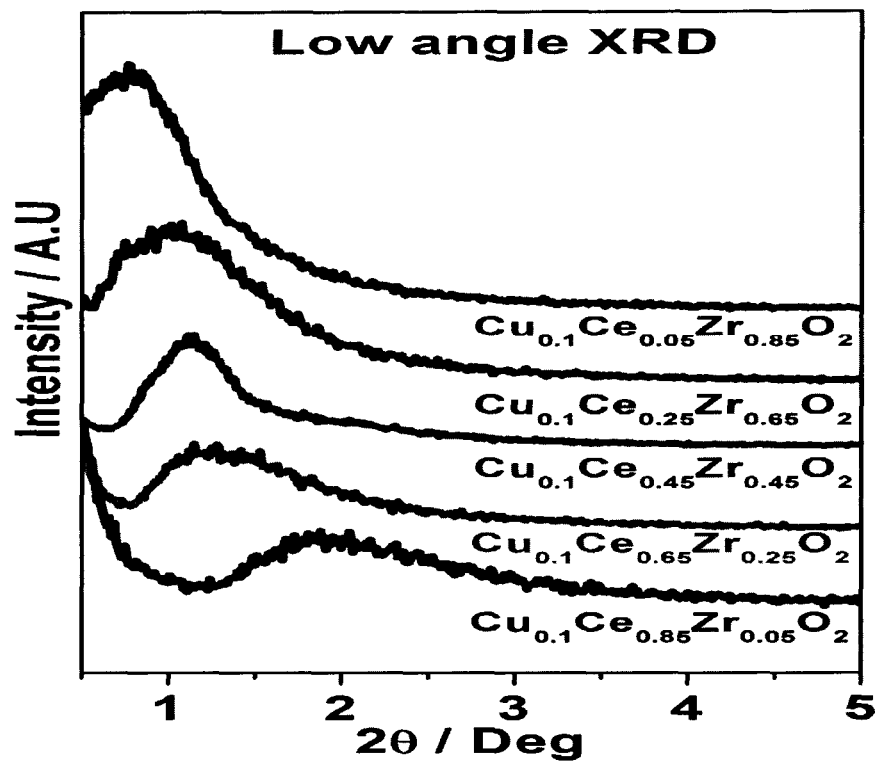
Fig: 2
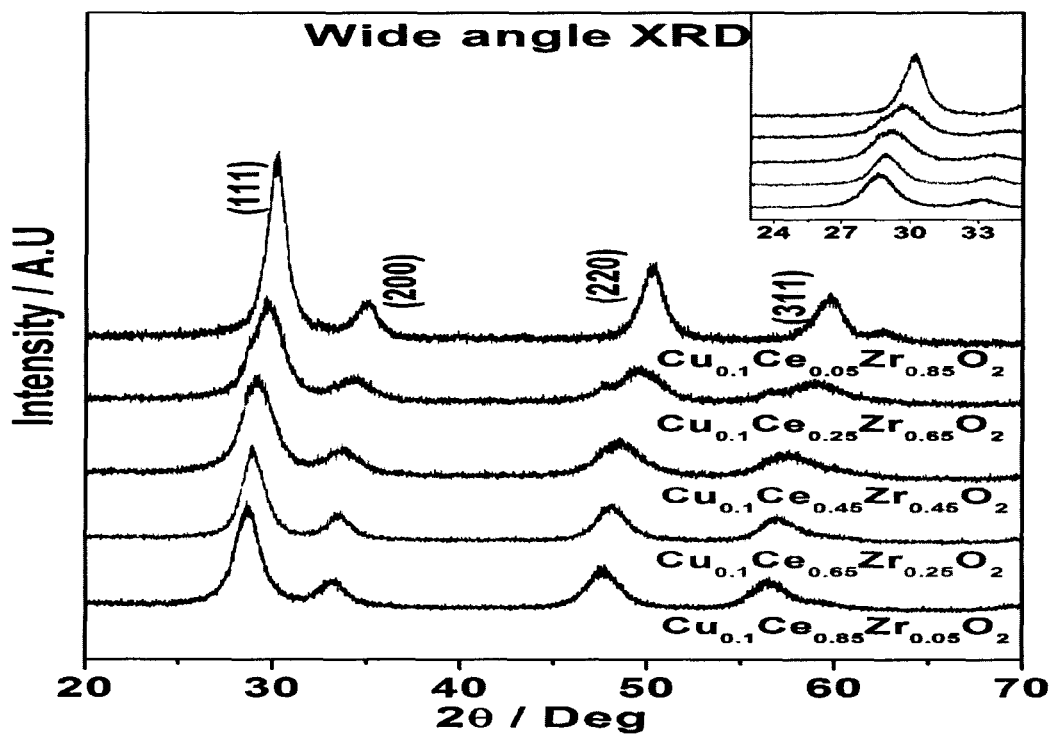
Fig: 3

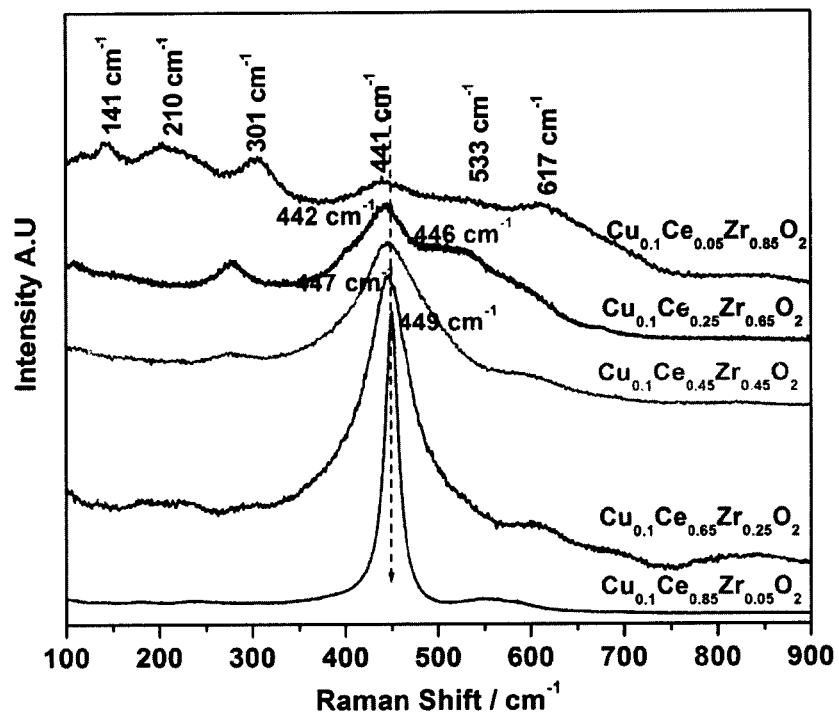
Fig: 4
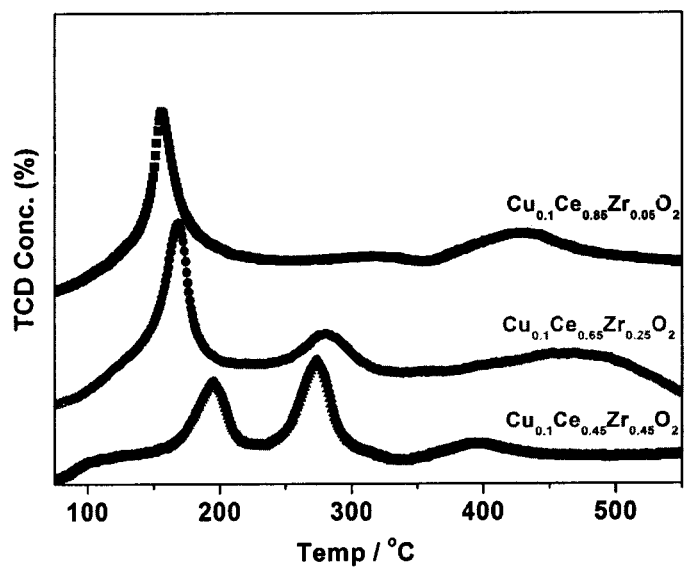
Fig: 5

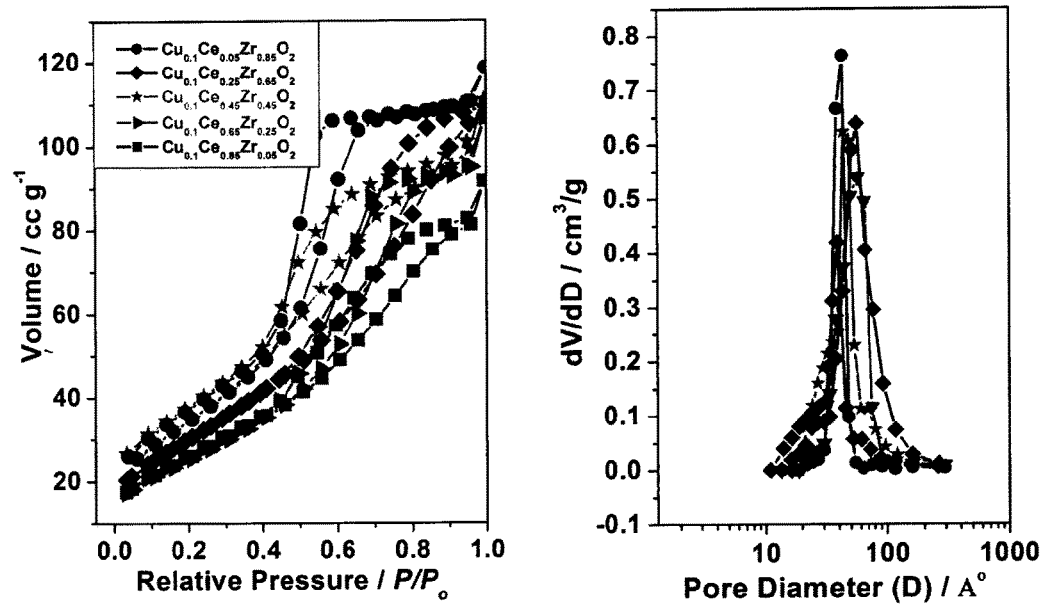
Fig: 6
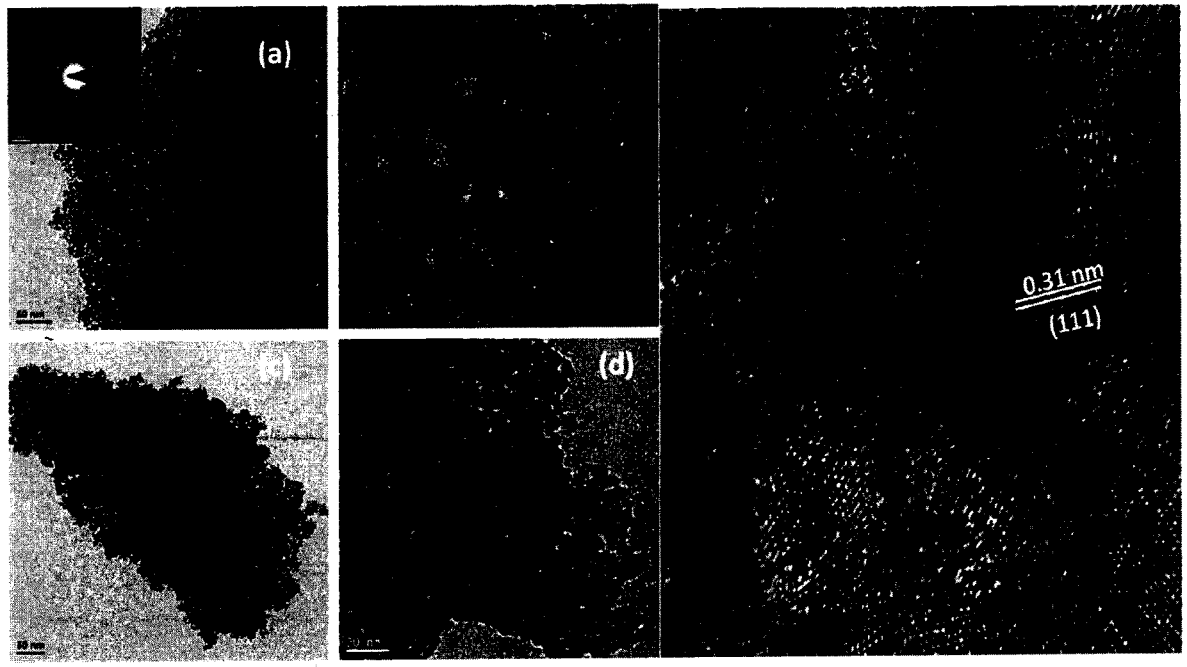
Fig: 7

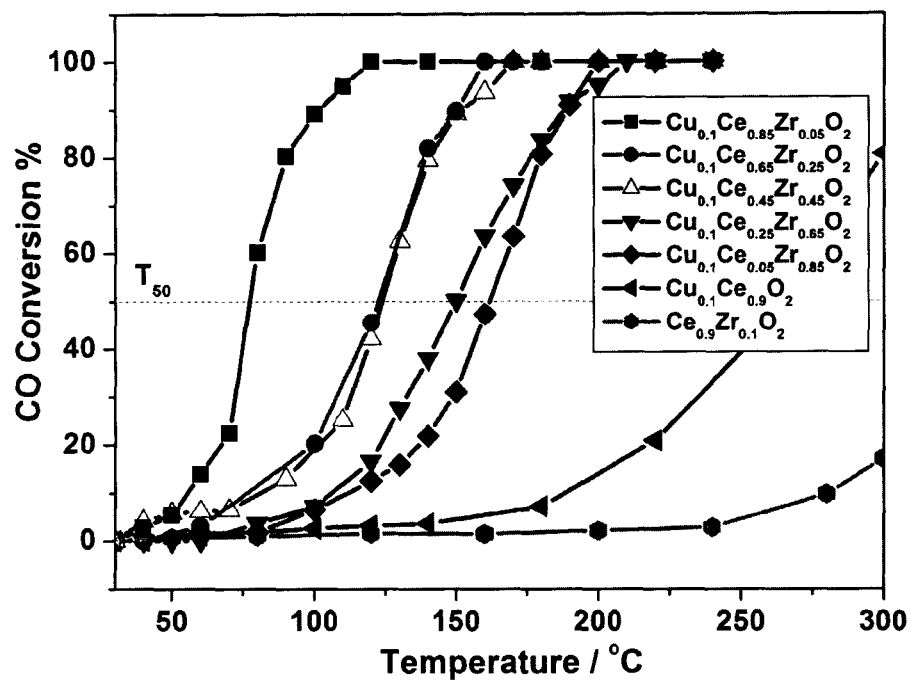
Fig: 8
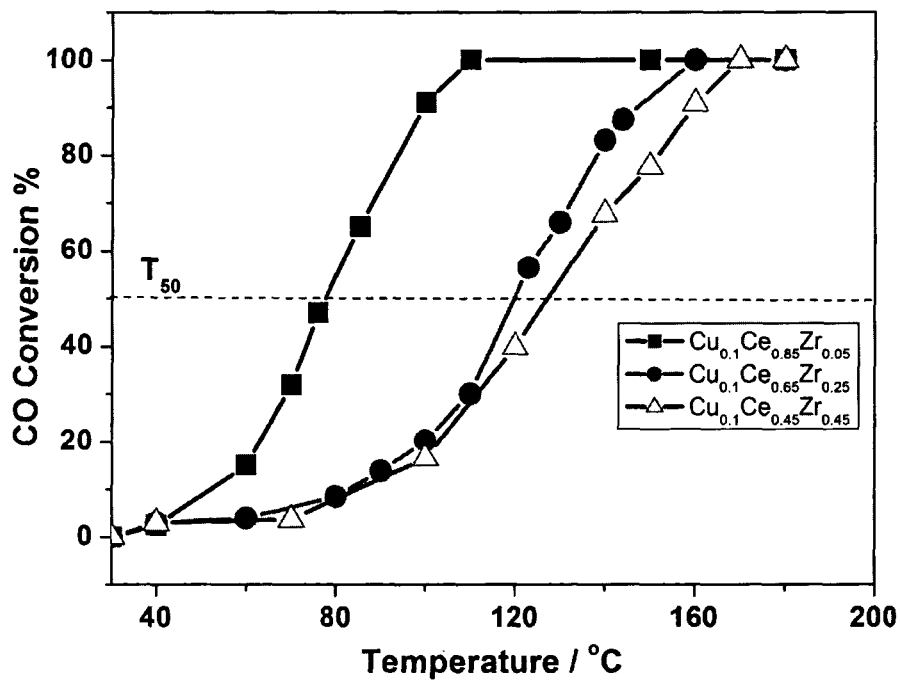
Fig: 9

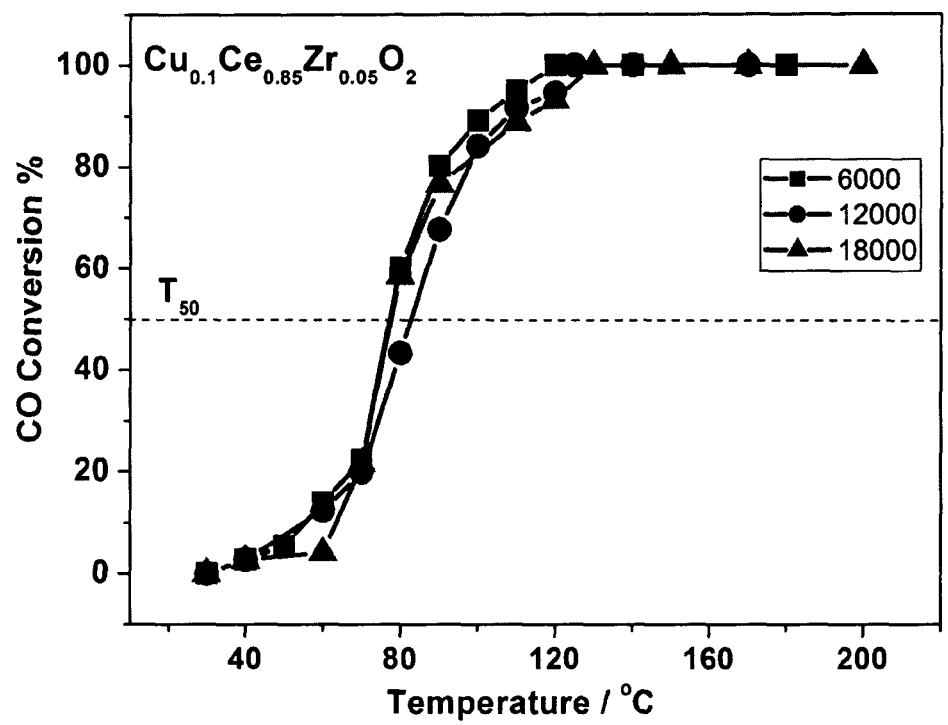
Fig: 10
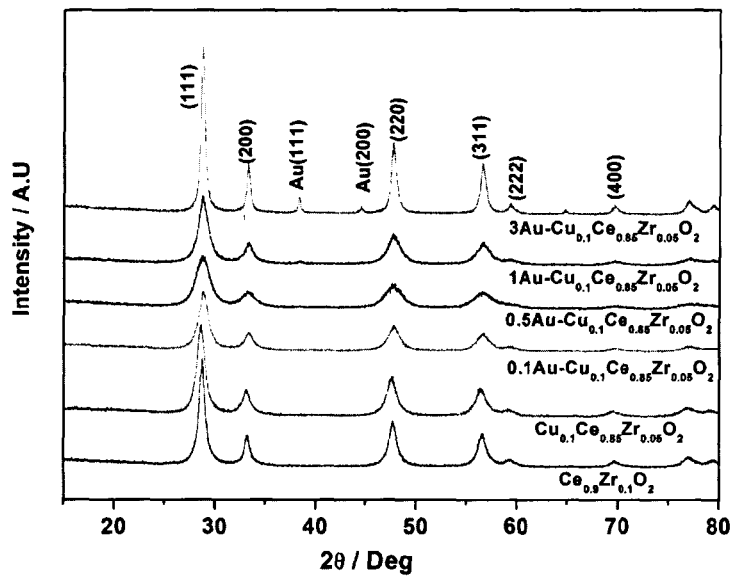
Fig: 11

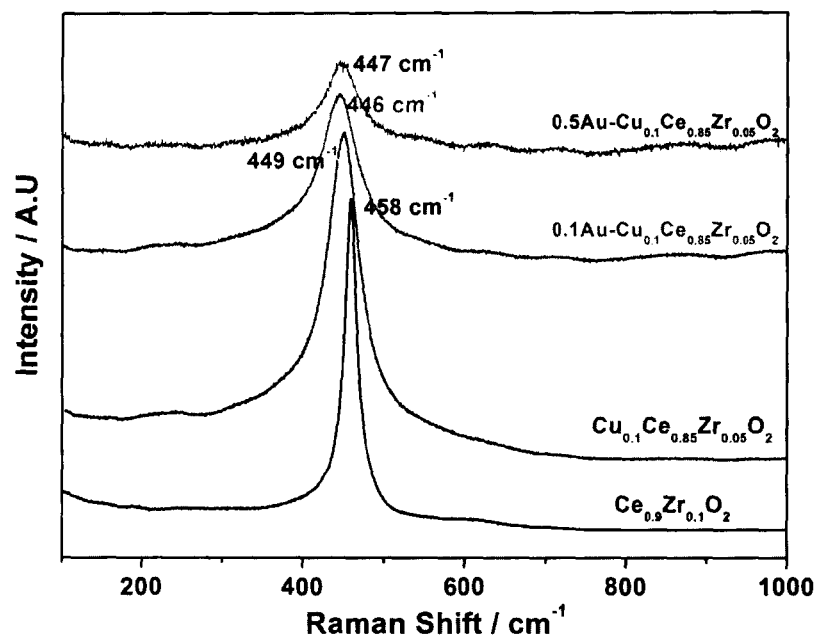
Fig: 12
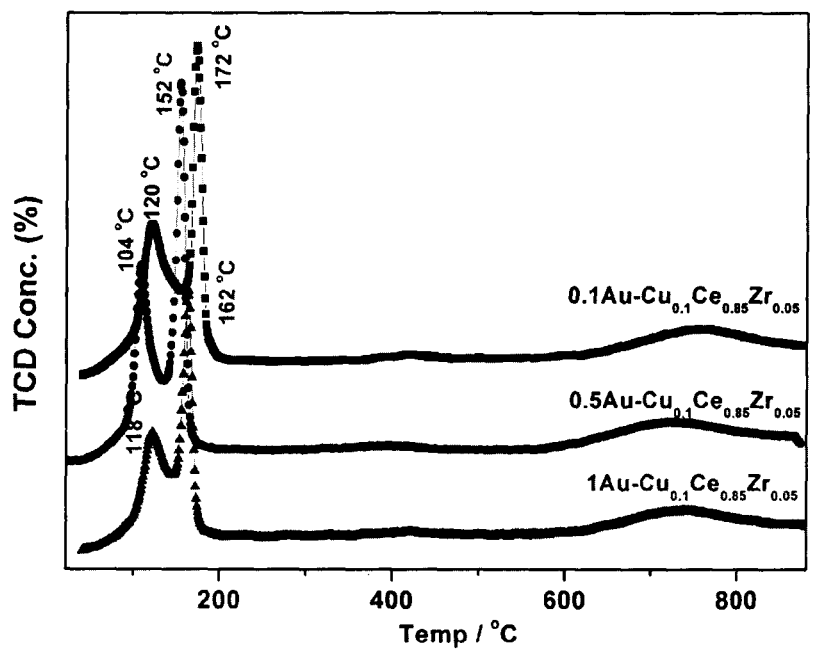
Fig: 13

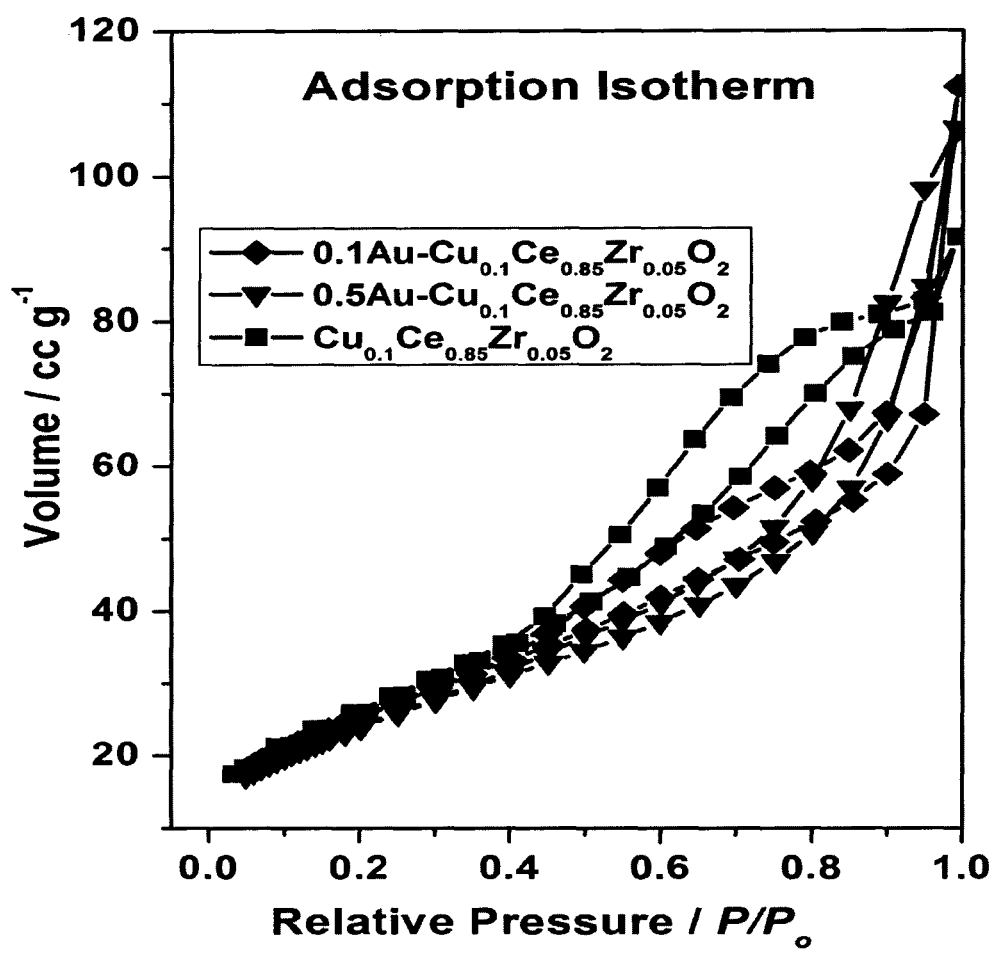
Fig: 14
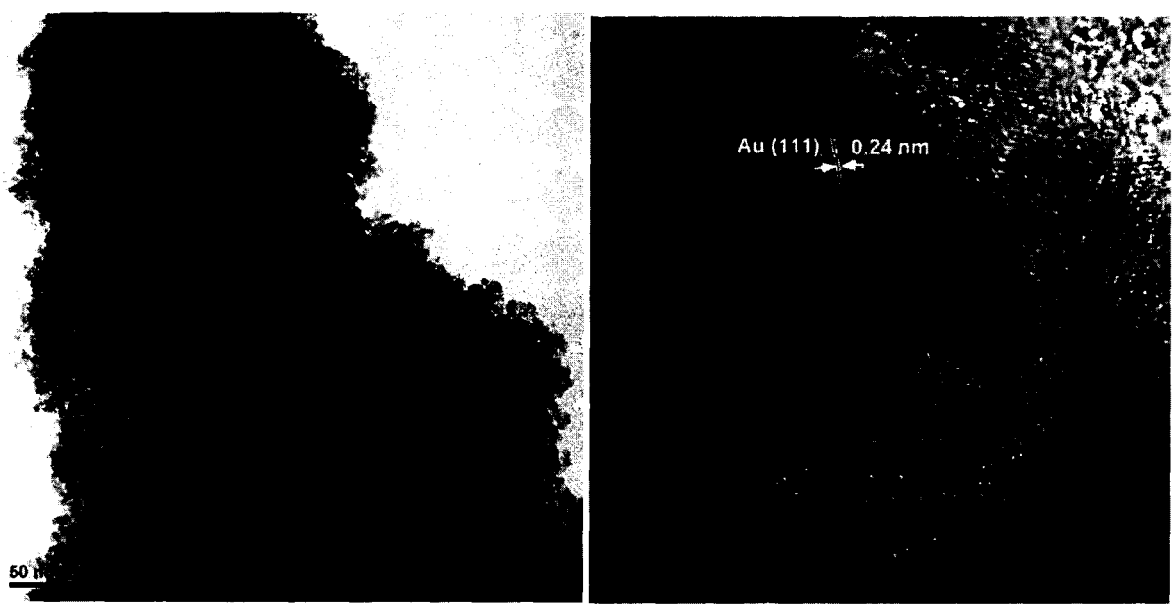
Fig: 15

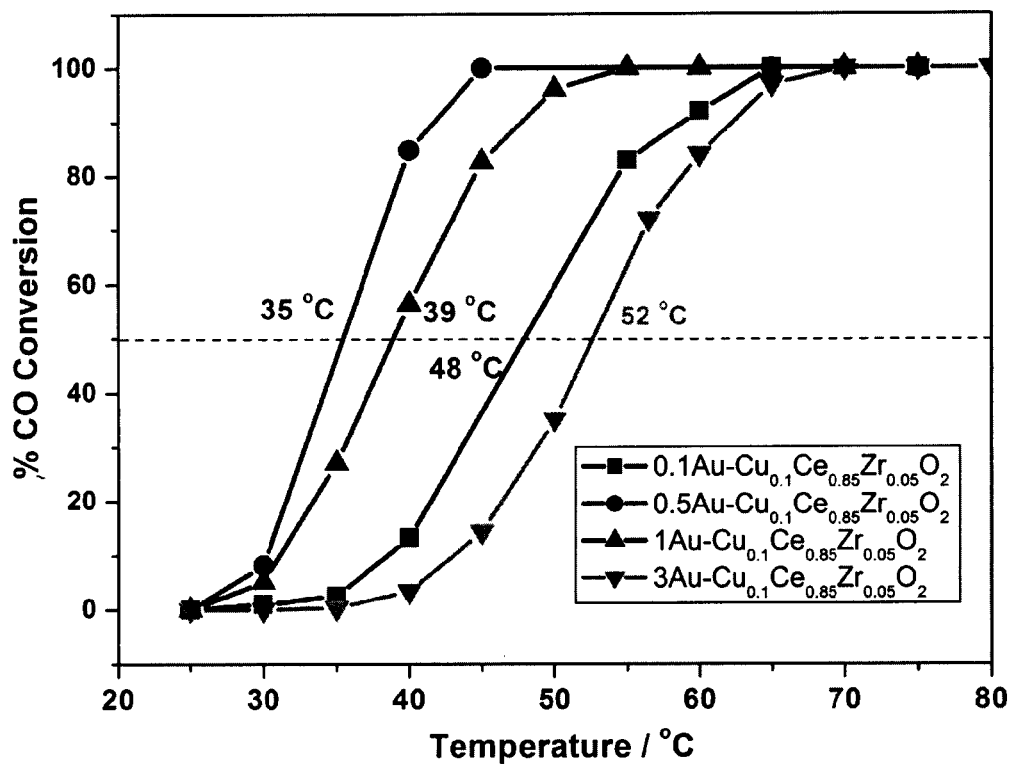
Fig: 16
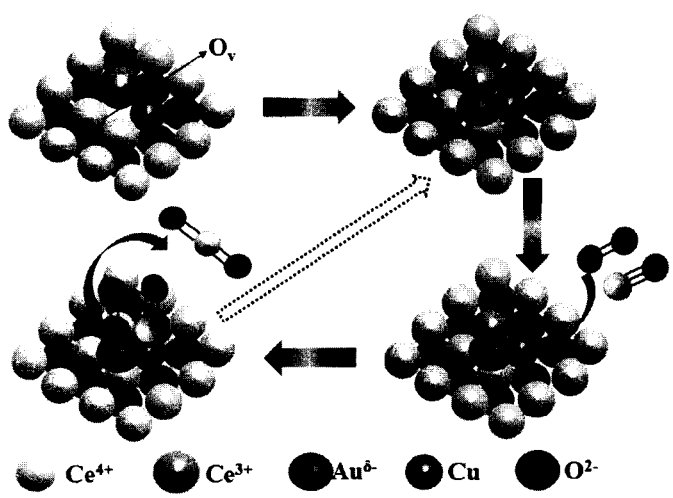
Fig: 17

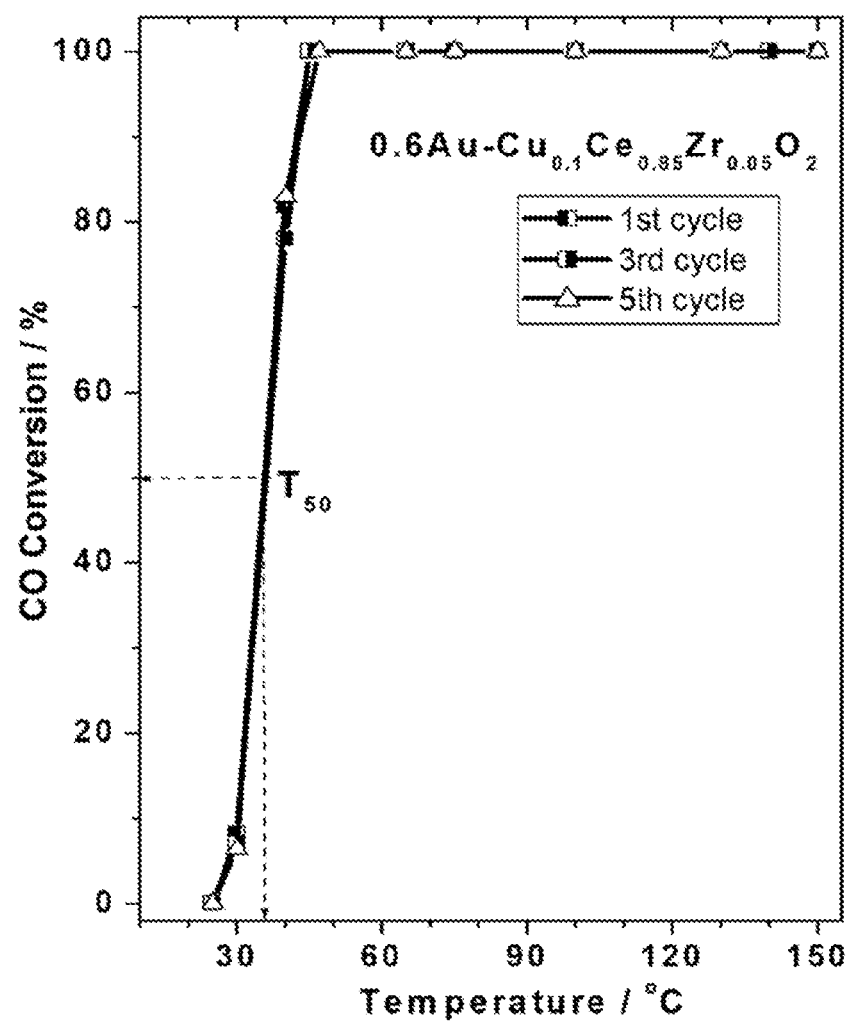
Fig: 18

Fig: 20

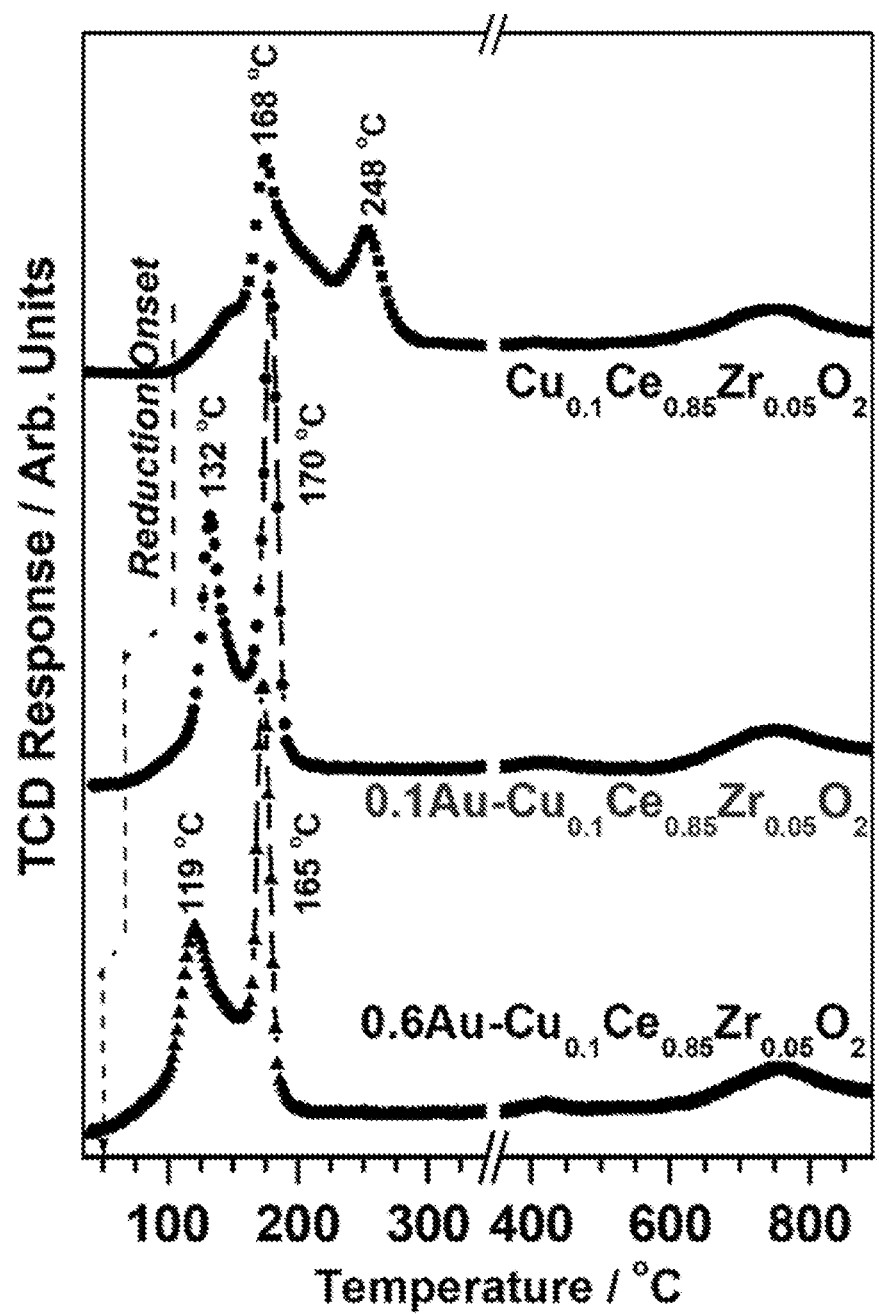
Fig: 22

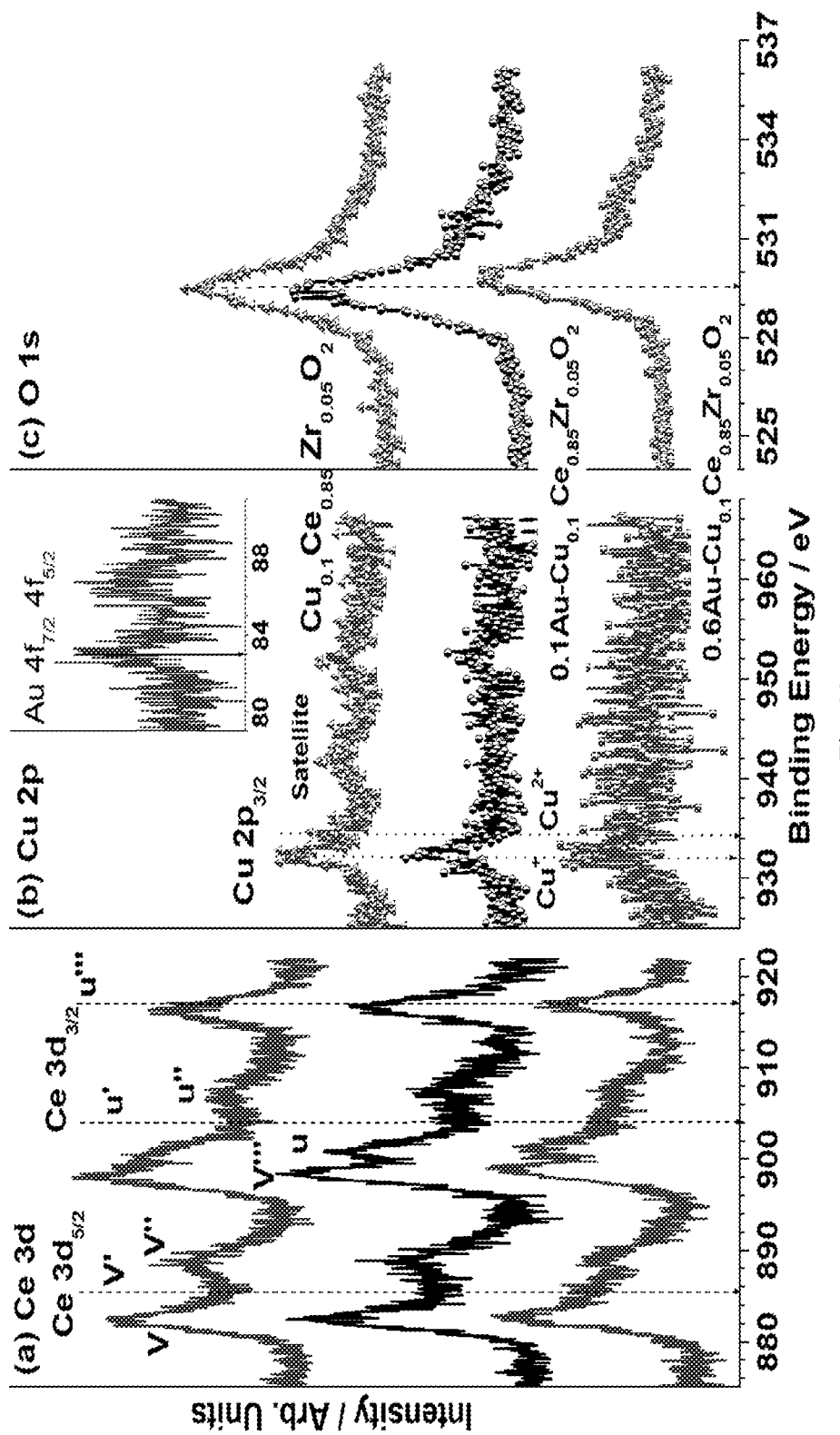
Fig: 23

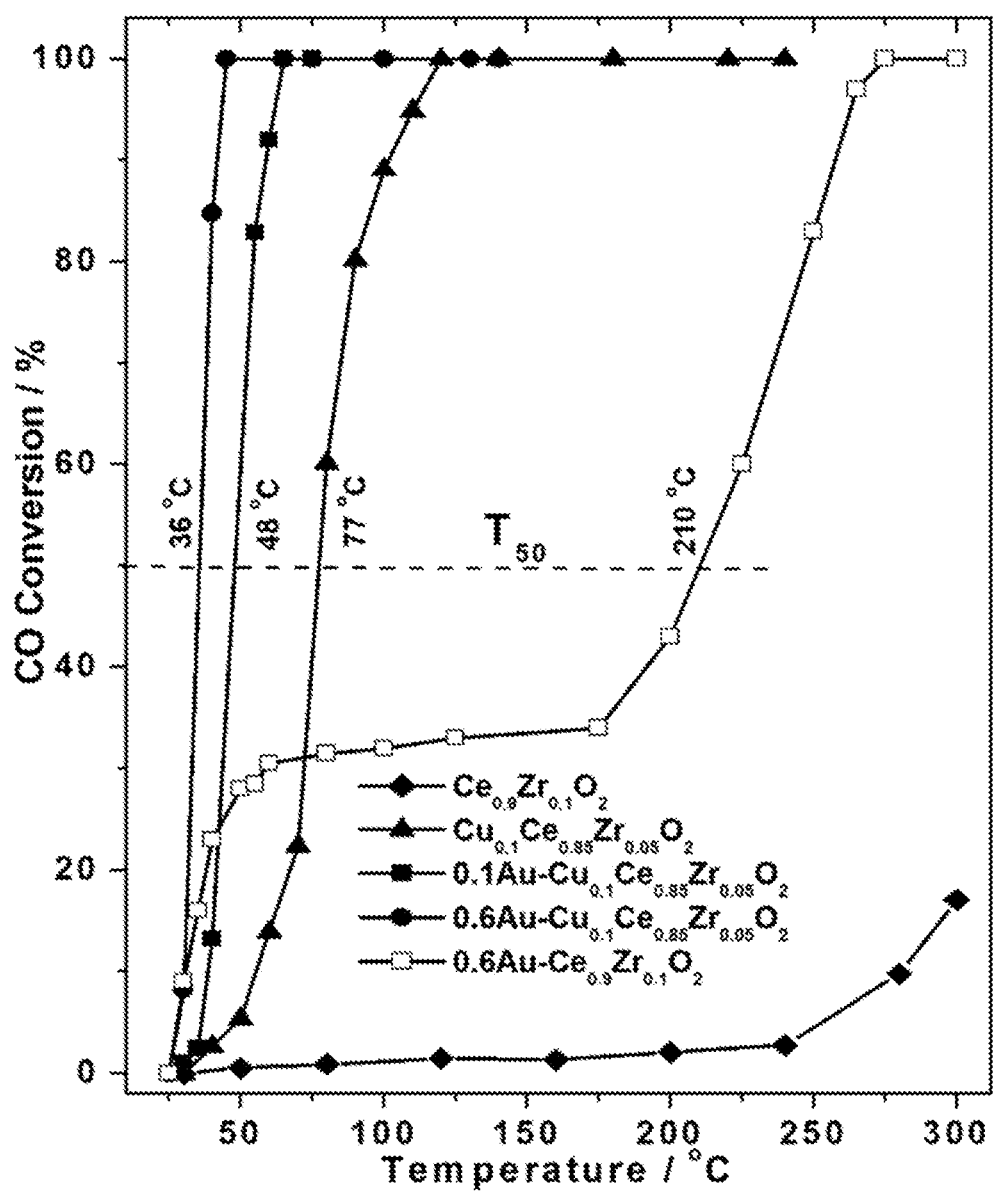
Fig: 24

TEMPERATURE TUNABLE MESOPOROUS GOLD DEPOSITED CO OXIDATION CATALYST

FIELD OF THE INVENTION

The present invention relates to a gold deposited mesoporous CO oxidation catalyst of formula XAu-$M_{0.1}Ce_{0.85}Zr_{0.05}O_2$ wherein X=0.01-10%, M is selected from Cu, Co or Mn. Particularly, the present invention relates to process for the preparation of gold deposited CO oxidation catalyst using photodeposition method with net negative charge on gold.

BACKGROUND AND PRIOR ART OF THE INVENTION

As long as the coal based power plants, petroleum based automobiles exists and deep fried cooking is practiced, CO and volatile organic compound oxidation shall remain a challenge to researchers. Especially, oxidation catalysts which can work at and around ambient temperatures are in constant demand and till date there is no sustainable solution available. Certainly, Haruta et al work on nano gold based catalytic materials revolutionized this area of research, and research in many fringe areas are also leading towards better understanding. Nonetheless, many questions remain unanswered and they are increasingly addressed by recent reviews. However, positive facts about nano gold materials are well proven, such as nano gold exhibits ambient and sub-ambient temperature CO oxidation activity on reducible supports, molecular oxygen dissociation occurs on nano gold, and particle size dependent activity. However, the mechanism behind the low temperature activity and the state of gold is yet to be settled and controversial too.

Article titled "Catalytic activity of Au—Cu/$CeO_2$—$ZrO_2$ catalysts in steam reforming of methanol" C Pojanavaraphan et al. published in *Applied Catalysis A: General*, Volume 456, 10 Apr. 2013, Pages 135-143 reports bimetallic Au—Cu/$Ce_{0.75}Zr_{0.25}O_2$ catalysts prepared by deposition-precipitation were tested for steam reforming of methanol (SRM) in the range of 200-500° C. Many effective parameters—Au/Cu atomic ratio, gas pre-treatment, total metal loading, and calcination temperature—were investigated and correlated with catalyst properties. At the Au/Cu ratio of 1/3, the homogeneous Au—Cu alloy was found to be active for SRM, while an inhomogeneous or partially developed alloy formation was found after applying $H_2$ and $O_2$ pre-treatments. There were no significant differences in catalytic activity with different total loadings and calcination temperatures; however, the 7 wt % Au—Cu catalyst calcined at 300° C. exhibited complete methanol conversion, 82% $H_2$ selectivity, and 1% CO selectivity at a low temperature of 300° C. In regards to stability, the bimetallic catalyst displayed a long life, even though coke and metallic copper were formed. Article titled "Preparation and characterization of nanocrystalline, high-surface area Cu—Ce—Zr mixed oxide catalysts from homogeneous co-precipitation" by F Huber et al. published in *Chemical Engineering Journal*, Volume 137, Issue 3, 15 Apr. 2008, Pages 686-702 reports $CU_{0.23}Ce_{0.54}Zr_{0.23}$ mixed oxides prepared by homogeneous co-precipitation with urea. The resulting materials exhibit high-surface area and nanocrystalline primary particles. The material consists of a single fluorite-type phase according to XRD and TEM. STEMEDS analysis shows that Cu and Zr are in homogeneously distributed throughout the ceria matrix. EXAFS analysis indicates the existence of CuO-like clusters inside the ceria-zirconia matrix. The pore structure and surface area of the mixed oxides are affected by preparation parameters during both precipitation (stirring) and the following heat treatment (drying and calcination). TPR measurements show that most of the copper is reducible and not inaccessibly incorporated into the bulk structure. Reduction-oxidation cycling shows that the reducibility improves from the first to the second reduction cycle, probably due to a local phase segregation in the metastable mixed oxide with gradual local copper enrichment during heat treatment.

Article titled "Effect of catalyst preparation on Au/$Ce_{1-x}Zr_xO_2$ and Au—Cu/$Ce_{1-x}Zr_xO_2$ for steam reforming of methanol" by C Pojanavaraphan et al. published in *International Journal of Hydrogen Energy*, 6 Feb. 2013; 38 (3), 1348-1362, reports 3 wt % gold (Au) catalysts on $CeO_2$—$ZrO_2$ mixed oxides, prepared by co-precipitation (CP) and the sol-gel (SG) technique, for steam reforming of methanol (SRM). Uniform $Ce_{1-x}Zr_xO_2$ solid solution was dependent on the Zr/Ce ratio, where the incorporation of Zr4+ into the Ce4+ lattice with a ratio of 0.25 resulted in smaller ceria crystallites and better reducibility, and was found to be efficient for SRM activity. The catalytic activity was suppressed when the ratio was ≥0.5, which led to the segregation of Zr from solid solution and sintering of Au nanoparticles. It was found that the CP technique produced better catalysts than SG in this case. For the bimetallic catalysts, the co-operation of Au—Cu supported on $Ce_{0.75}Zr_{0.25}O_2$ (CP) exhibited superior activities with complete methanol conversion and low CO concentration at 350° C. Furthermore, the size of the alloy particle was strongly dependent on the pH level during preparation. Article titled "Influence of gold on Ce—Zr—Co fluorite-type mixed oxide catalysts for ethanol steam reforming" by J C Vargas published in *Catalysts*, 2012, 2(1), 121-138 reports the effect of gold presence on carbon monoxide oxidation and ethanol steam reforming catalytic behaviour of two Ce—Zr—Co mixed oxides catalysts with a constant Co charge and different Ce/Zr ratios was investigated. The Ce—Zr—Co mixed oxides were obtained by the pseudo sol-gel like method, based on metallic propionates polymerization and thermal decomposition, whereas the gold-supported Ce—Zr—Co mixed oxides catalysts were prepared using the direct anionic exchange. The catalysts were characterized using XRD, TPR, and EDXS-TEM. The presence of Au in doped Ce—Zr—Co oxide catalyst decreases the temperature necessary to reduce the cobalt and the cerium loaded in the catalyst and favours a different reaction pathway, improving the acetaldehyde route by ethanol dehydrogenation, instead of the ethylene route by ethanol dehydration or methane re-adsorption, thus increasing the catalytic activity and selectivity into hydrogen.

Article titled "CO oxidation activity of Au/Ceria-Zirconia catalyst prepared by deposition-precipitation with urea" by Eloy del Rio et al. published in Topics in Catalysis, September 2011, Volume 54, Issue 13-15, pp 931-940 reports the activation of a 2.6 wt % Au/$Ce_{0.62}Zr_{0.38}O_2$ catalyst prepared by depositionprecipitation with urea is investigated. At 298 K, the activity for CO oxidation of the as-prepared sample is very low; it is significantly increased when heated at 418 K, under the reaction mixture, and much strongly when pre-treated under flowing $O_2$ (5%)/He, at 523 K. As revealed by XPS, FTIRS, HAADF-STEM, and HRTEM studies, the activation process consists of the transformation of the initial urea-containing Au(III) precursor deposited on the support into a highly dispersed metal phase (Au nano-particle mean size: 1.8 nm).

Article titled "Photodeposition of gold on titanium dioxide for photocatalytic phenol oxidation" by M C Hidalgo et al. published in *Applied Catalysis A: General*, Volume 397, Issues 1-2, 30 Apr. 2011, Pages 112-120 reports photodeposition using illumination with a high light intensity UV-vis lamp (140 W/m² UVA range) resulted to be an ineffective method for obtaining nanoparticles of gold on the titania, producing very large and poorly distributed gold deposits. Thus obtained materials did not show any important improvement of their photocatalytic activity tested for phenol oxidation. Best photocatalytic behaviour for phenol photodegradation was obtained for Au—$TiO_2$ samples prepared by photodeposition at low light intensity with 120 min photodeposition time for catalysts with a 0.5% and 1% nominal content of gold and with 60 min photodeposition time for catalyst with a 2% nominal content of gold.

Earlier inventors of present invention disclosed a poster tiltled "Mesoporous $Cu_{0.1}Ce_{0.85-x}Zr_xO_2$: Possibility of tuning CO oxidation at ambient conditions" presented by C. S. Gopinath et al. at the *third International Conference on Multifunctional, Hybrid and Nanomaterials (Hybrid Materials* 2013) held on Mar. 3-7, 2013 in Sorrento, Italy reports mesoporous Cu doped Ce—Zr mixed oxide using tricopolymer as a templating agent in one-pot synthesis. Synthesized catalysts have been characterized by all physico chemical characterization methods. Lattice doping of Cu have been confirmed through XRD and Raman analysis. Surface area of $Cu_{0.1}Ce_{0.85-x}Zr_xO_2$ materials exhibit a surface area of 110-170 m²/g. Catalytic activity of $Cu_{0.1}Ce_{0.85-x}Zr_xO_2$ have been explored for CO oxidation reaction and $Cu_{0.1}Ce_{0.85}Zr_{0.05}O_2$ catalyst showing best activity at 76° C. for $T_{50}$. There is a large possibility of tune the CO oxidation at ambient conditions by varying parameters such as different transition metal ions, porosity etc.

Literature search reveals that there are not many non-gold based ambient or near-ambient oxidation catalysts are available. There are claims that nano gold surface state to be either zero valent, anionic or cationic, and evidences are available for all those oxidation states. This is further complicated by different preparation procedures followed by different groups, and the nature of support also exhibits a significant role in the catalytic CO oxidation.

Therefore, there is need in the art to develop a catalyst which can perform the carbon monoxide (CO) oxidation from near room temperatures to high temperatures. According the present inventors develop Au deposited Cu0.1Ce0.85Zr0.05 catalysts perform the carbon monoxide (CO) oxidation can be performed from near room temperatures to high temperatures by varying the composition of Au deposited Cu0.1Ce0.85Zr0.05 catalysts. This would be cost effective approach and likely to be more sustainable than nano gold only based catalysts.

OBJECTIVE OF THE INVENTION

The main objective of the present invention is to provide a mesoporous Au deposited oxidation catalyst of formula $XAu-M_{0.1}Ce_{0.85}Zr_{0.05}O_2$ wherein X=0.01-10%, M is selected from Cu, Co or Mn. Another objective of the present invention is to provide a process for the preparation of mesoporous Au deposited oxidation catalyst of formula $XAu-M_{0.1}Ce_{0.85}Zr_{0.05}O_2$ wherein X=0.01-10%, M is selected from Cu, Co or Mn using photodeposition method.

SUMMARY OF THE INVENTION

Accordingly, present invention provides a mesoporous gold deposited oxidation catalyst of formula $Au-M_{0.1}Ce_{0.85}Zr_{0.05}O_2$, characterized in that gold deposited on the catalyst in nano form in the range of 0.01-10 atomic wt % of gold, wherein M is selected from Cu, Co or Mn.

In an embodiment of the present invention, the gold deposited on the catalyst is preferably in the range of 0.1-3 atomic wt % of gold.

In another embodiment, present invention provides a process for the preparation of mesoporous gold deposited oxidation catalyst according to claim 1, comprising the steps of:

a) adding $M(NO_3)_2.3H_2O$, $Ce(NO_3)_3.6H_2O$ and $ZrOCl_2.8H_2O$ into the ethanol solution of triblock co-polymer (P-123) with stirring for period in the range of 30 min to 2 h to obtain transparent coloured sol;

b) aging the transparent coloured sol for period in the range of 46 to 48 hr at temperature in the range of 40 to 45° C.;

c) drying the aged sol as obtained in step (b) followed by calcining at temperature in the range of 350 to 400° C. for period in the range of 2 to 4 h with the ramping rate of 1° C./min to get the $M_{0.1}Ce_{0.85}Zr_{0.05}O_2$ mesoporous mixed oxide;

d) adding water containing $HAuCl_4.3H_2O$ solution into methanolic solution of $M_{0.1}Ce_{0.85}Zr_{0.05}O_2$ mesoporous mixed oxide as obtained in step(c);

e) irradiating the reaction mixture of step (d) under UV light for period in the range of 30 min. to 2 hrs and the solution is allowed to settle down and then decanted;

f) centrifuging the remaining solution of step (e) with water and ethanol at speed in the range of 4000 to 6000 rpm for period in the range of 8 to 10 min followed by drying to obtain mesoporous gold deposited oxidation catalyst.

In yet another embodiment of the present invention, drying in step (c) is carried out at temperature in the range of 90 to 110° C. for period in the range of 20 to 24 hr.

In yet another embodiment of the present invention, drying in step (f) is carried out at temperature in the range of 40 to 45° C. for period in the range of 8 to 16 h and at temperature in the range of 80 to 100° C. for period in the range of 8 to 12 h.

In yet another embodiment of the present invention, said catalyst is useful for oxidation of CO.

In yet another embodiment of the present invention, said catalyst exhibit CO conversion efficiency in the range of 50 to 100% between 35 and 69 deg C.

BRIEF DESCRIPTION OF THE DRAWINGS

FIG. 1: General schematic representation of the synthesis of Mesoporous $Cu_{0.1}Ce_{0.9-x}Zr_xO_2$ (x=0.5 to 0.85).

FIG. 2: Low angle XRD of mesoporous $Cu_{0.1}Ce_{0.9-x}Zr_xO_2$ (x=0.05 to 0.85) materials.

FIG. 3: Wide angle XRD pattern of mesoporous $Cu_{0.1}Ce_{0.9-x}Zr_xO_2$ (x=0.05 to 0.85) materials.

FIG. 4: Raman Spectra of mesoporous $Cu_{0.1}Ce_{0.9-x}Zr_xO_2$ (x=0.05 to 0.85) materials FIG. 5: Temperature programmed reduction (TPR) analysis of mesoporous $Cu_{0.1}Ce_{0.9-x}Zr_xO_2$ (x=0.05 to 0.85) materials.

FIG. 6: $N_2$ adsorption-desorption isotherm and pore size distribution of mesoporous $Cu_{0.1}Ce_{0.9-x}Zr_xO_2$ (x=0.05 to 0.85) materials.

FIG. 7: TEM images of mesoporous $Cu_{0.1}Ce_{0.85}Zr_{0.05}O_2$ catalyst

FIG. 8: CO oxidation with 1:5 ratio of $CO:O_2$ at 6000 GHSV (gas hourly space velocity) over mesoporous $Cu_{0.1}Ce_{0.9-x}Zr_xO_2$ (x=0.05 to 0.85) materials.

FIG. 9: CO oxidation with 1:2 ratio of CO:$O_2$ at 6000 GHSV over mesoporous $Cu_{0.1}Ce_{0.9-x}Zr_xO_2$ (x=0.05 to 0.85) materials FIG. 10: CO oxidation with 1:5 ratio of CO:$O_2$ at different GHSV over mesoporous $Cu_{0.1}Ce_{0.9-x}Zr_xO_2$ (x=0.05 to 0.85) materials.

FIG. 11: Wide angle XRD pattern of Au deposited on mesoporous $Cu_{0.1}Ce_{0.85}Zr_{0.05}O_2$ catalysts.

FIG. 12: Raman Spectra of Au on $Cu_{0.1}Ce_{0.85}Zr_{0.05}O_2$ catalyst.

FIG. 13: TPR analysis of Au on $Cu_{0.1}Ce_{0.85}Zr_{0.05}O_2$ catalyst.

FIG. 14: $N_2$ adsorption-desorption isotherm of Au on mesoporous $Cu_{0.1}Ce_{0.85}Zr_{0.05}O_2$ catalyst FIG. 15: TEM images of mesoporous 0.5Au—$Cu_{0.1}Ce_{0.85}Zr_{0.05}O_2$ catalyst.

FIG. 16: CO oxidation with 1:5 ratio of CO:$O_2$ at 6000 GHSV over Au on $Cu_{0.1}Ce_{0.85}Zr_{0.05}O_2$ catalyst.

FIG. 17: A cartoon depicting the possible surface structure and mechanistic changes occurring under reaction conditions. Carbon and oxygen in CO, O2 and CO2 is depicted as small grey and red solid circles.

FIG. 18: Recyclability of 0.6Au—$Cu_{0.1}Ce_{0.85}Zr_{0.05}O_2$ catalyst with 1:5 ratio of CO:$O_2$ at 6000 GHSV.

FIG. 22: TPR of $Cu_{0.1}Ce_{0.85}Zr_{0.05}O_2$, 0.1Au—$Cu_{0.1}Ce_{0.85}Zr_{0.05}O_2$ and 0.6Au—$Cu_{0.1}Ce_{0.85}Zr_{0.05}O_2$ catalysts. Dashed line indicates the onset of reduction of all catalysts.

FIG. 23: XPS spectra recorded for virgin and Au-deposited $Cu_{0.1}Ce_{0.85}Zr_{0.05}O_2$, catalysts for (a) Ce 3d, (b) Cu 2p, (c) O 1s core levels. Au 4f core level is shown in inset in panel b for 0.6Au-$Cu_{0.1}Ce_{0.85}Zr_{0.05}O_2$ catalysts. All $Ce_{3+}$ features are indicated by dashed arrows in panel a. A $Cu^+$ and $Cu^{2+}$ feature BE is indicated by dotted lines in panel b. It is also to be noted that Au $4f_{7/2}$ core level appears at 83.0 eV, indicating the anionic nature of gold nanoclusters.

FIG. 24: CO oxidation catalytic activity measured for (a) $Ce_{0.9}Zr_{0.1}O_2$ (b) $Cu_{0.1}Ce_{0.85}Zr_{0.05}O_2$ (c) 0.1Au—$Cu_{0.1}Ce_{0.85}Zr_{0.05}O_2$, (d) 0.6Au—$Cu_{0.1}Ce_{0.85}Zr_{0.05}O_2$, and (e) 0.6Au—$Ce_{0.9}Zr_{0.1}O_2$. CO+$O_2$ reaction was carried out with 1:5 ratio of CO:$O_2$ at 6000 GHSV.

DETAILED DESCRIPTION OF THE INVENTION

Figure 19:
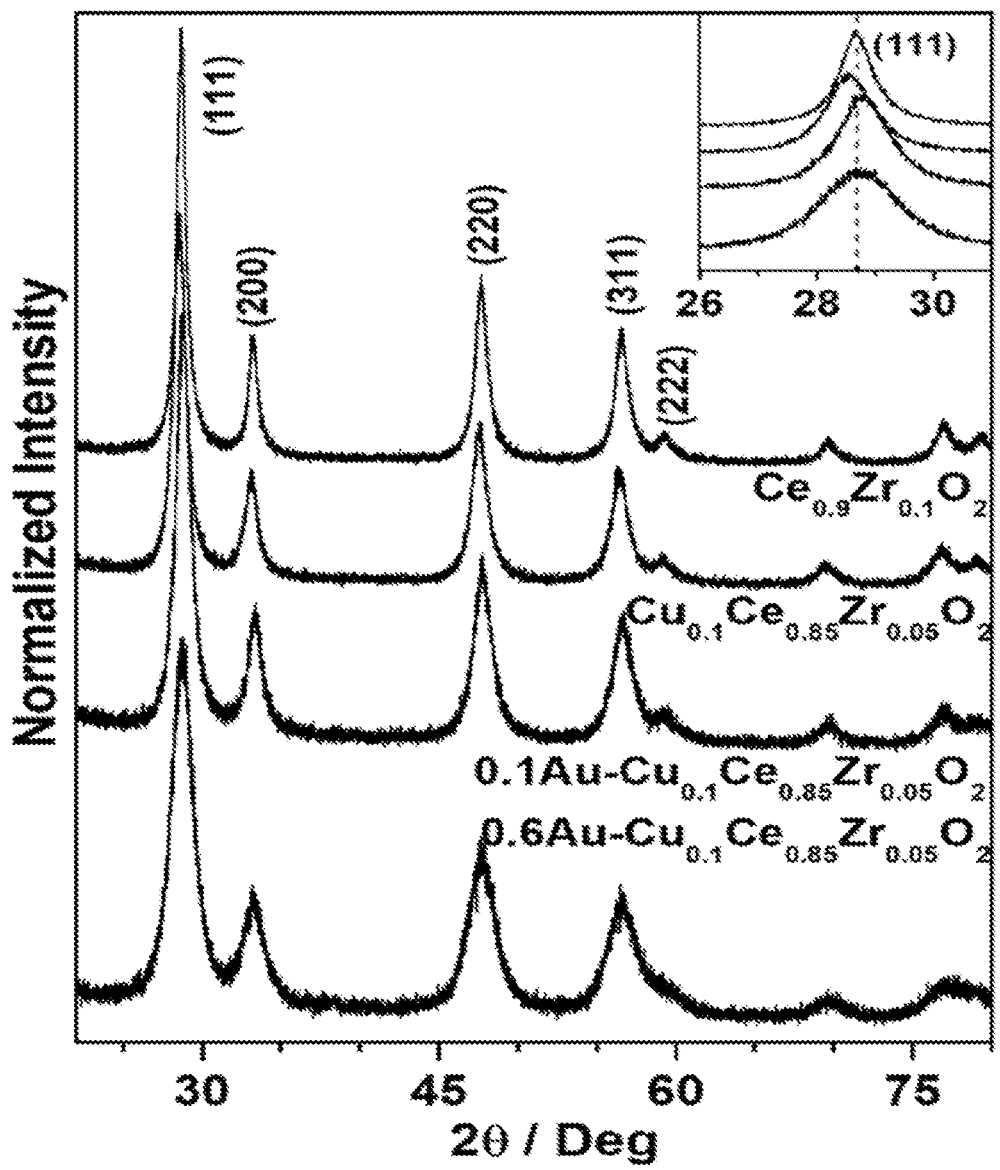
FIG. 19: Powder XRD pattern of $Ce_{0.9}Zr_{0.1}O_2$, Cu Ce0.85Zr$_{0.05}$O$_2$, 0.1 Au—$Cu_{0.1}Ce_{0.85}Zr_{0.05}O_2$, and 0.6Au—$Cu_{0.1}Ce_{0.85}Zr_{0.05}O_2$ catalysts. Inset shows an increase in line broadening from $Ce_{0.9}Zr_{0.1}O_2$ to 0.6AU-$Cu_{0.1}Ce_{0.85}Zr_{0.05}O_2$.

Present invention provides a mesoporous Au deposited oxidation catalyst of formula XAu-$M_{0.1}Ce_{0.85}Zr_{0.05}O_2$ wherein X=0.01-10%, M is selected from Cu, Co or Mn characterized in that gold deposited on the catalyst in nano form in the range of 0.01-10 atomic wt % of gold, preferably 0.1-3 atomic wt % of gold and demonstrates their application in CO oxidation.

Present invention provides a process for preparation of mesoporous Au deposited oxidation catalyst of formula XAu-$M_{0.1}Ce_{0.85}Zr_{0.05}O_2$ wherein X=0.01-10%, M is selected from Cu, Co, Mn using photodeposition method.

The mesoporous gold deposited oxidation catalysts of formula)(Au-$M_{0.1}Ce_{0.85}Zr_{0.05}O_2$ are selected from 0.1Au—$Cu_{0.1}Ce_{0.85}Zr_{0.05}O_2$, 0.5Au—$Cu_{0.1}Ce_{0.85}Zr_{0.05}O_2$, 1Au—$Cu_{0.1}Ce_{0.85}Zr_{0.05}O_2$ and 3Au—$Cu_{0.1}Ce_{0.85}Zr_{0.05}O_2$, 0.5Au—$Co_{0.1}Ce_{0.85}Zr_{0.05}O_2$, 0.1Au—$Mn_{0.1}Ce_{0.85}Zr_{0.05}O_2$, 0.5Au—$Mn_{0.1}Ce_{0.85}Zr_{0.05}O_2$, 1Au—$Co_{0.1}Ce_{0.85}Zr_{0.05}O_2$ Present invention provides a process for the preparation of mesoporous gold deposited oxidation catalyst of formula XAu-$M_{0.1}Ce_{0.85}Zr_{0.05}O_2$ wherein X=0.01-10% M is selected from Cu, Co, Mn comprising the steps of:

a) adding water containing $HAuCl_4.3H_2O$ solution to $M_{0.1}Ce_{0.85}Zr_{0.05}O_2$ catalyst dissolved in methanol;

b) irradiating the reaction mixture of step (a) under UV light for period in the range of 30 min. to 2 hrs and the solution is allowed to settle down and then decanted c) centrifuging the remaining solution of step (b) with water and ethanol at speed in the range of 4000 to 6000 rpm for period in the range of 8 to 10 min followed by drying to obtain mesoporous gold deposited oxidation catalyst.

The drying in oven in step (c) is carried out at temperature in the range of 40 to 45° C. for period in the range of 8 to 16 h and at temperature in the range of 80 to 100° C. for period in the range of 8 to 12 h to get desired catalyst.

The gold deposited catalysts (XAu-$M_{0.1}Ce_{0.85}Zr_{0.05}O_2$) were evaluated for CO oxidation catalysis. The oxidation catalysis begins at ambient temperatures and a steep rise in CO oxidation activity can be witnessed in FIG. 25 for 0.1Au and 0.6Au containing catalysts with 100 (50) % CO conversion temperatures are at 65 (48°) C. and 47 (36°) C., respectively. As in the earlier case, CO oxidation activity onset can be tuned by varying the gold content from 0 to 0.6 wt %. However, further increase in gold content to 1 wt % increases the CO oxidation onset temperature. 0.6Au—$Ce_{0.9}Zr_{0.1}O_2$ catalyst shows a different trend in activity. Although ambient temperature activity was observed, like the above catalysts, only 30% CO conversion was observed; 100% (50%) CO conversion was observed at rather 285 (210°) C. very high temperatures. Above observation underscores the role of Cu in bringing down 100% CO conversion temperature and its part in facilitating the same in XAu—$CU_{0.1}Ce_{0.85}Zr_{0.05}O_2$.

The recyclability of the 0.6Au—$Cu_{0.1}Ce_{0.85}Zr_{0.05}O_2$ catalyst was tested for five cycles by simply cooling down the reactor temperature after each reaction to a maximum temperature of 150° C. and without any further treatment (see FIG. 19). Catalyst was held at 150° C. for 60 min at the end of each cycle. Very similar CO oxidation catalytic activity was observed without any significant difference in the activity in each cycle implies the efficacy of the mesoporous catalysts. It also underscores that the catalysts does not undergo any structural or microstructural changes during the repeated activity evaluation.

In another preferred embodiment, the present invention provides gold deposited mesoporous oxidation catalyst from mesoporous oxidation catalyst wherein the physiochemical characteristics are as shown below in Table 2.

TABLE 2

Physicochemical characteristics of mesoprous $XAu-M_{0.1}Ce_{0.85}Zr_{0.05}O_2$ catalyst

| Material | Cryst. Size | $S_{BET}$ m²g⁻¹ | Pore size (Å) | $V_p$ (mL g⁻¹) | CO conversation $T_{50}$ ($T_{100}$) °C. | Au (Mole %) |
|---|---|---|---|---|---|---|
| $Ce_{0.9}Zr_{0.1}O_2$ | 12.4 | 140.1 | 55.45 | 0.1871 | — | — |
| $Cu_{0.1}Ce_{0.85}Zr_{0.05}O_2$ | 8.4 | 131.7 | 52.12 | 0.1716 | 77 (120) | — |
| $0.1Au-Cu_{0.1}Ce_{0.85}Zr_{0.05}O_2$ | 7.9 | 95.8 | 39.5 | 0.0912 | 48 (64) | 0.092 |
| $0.5Au-Cu_{0.1}Ce_{0.85}Zr_{0.05}O_2$ | 5.2 | 87.2 | 47.3 | 0.1028 | 35 (45) | 0.514 |
| $1Au-Cu_{0.1}Ce_{0.85}Zr_{0.05}O_2$ | 7.3 | 84.8 | 49.4 | 0.1240 | 39 (55) | 0.987 |
| $3Au-Cu_{0.1}Ce_{0.85}Zr_{0.05}O_2$ | 15.8 | 79.2 | 37.8 | 0.0853 | 52 (69) | 3.126 |
| $1Au-Co_{0.1}Ce_{0.85}Zr_{0.05}O_2$ | 11.1 | 121.0 | 44.4 | 0.121 | 45 (62) | 1.01 |
| $0.5Au-MnCo_{0.1}Ce_{0.85}Zr_{0.05}O_2$ | 8.8 | 94.7 | 51.0 | 0.105 | 51 (69) | 0.48 |

EXAMPLES

Following examples are given by way of illustration and therefore should not be construed to limit the scope of the invention.

Example 1 a. Synthesis of Meso-$Cu_{0.1}Ce_{0.9-x}Zr_xO_2$ (x=0.5 to 0.85)

Following starting materials, $Ce(NO_3)_3 \cdot 6H_2O$, $ZrOCl_2 \cdot 9H_2O$ and $Cu(NO_3)_3 \cdot 3H_2O$, were employed as precursors. Initially, triblock co-polymer, known as P123, has been dissolved completely in 50 ml of ethanol. Then the desired quantity of $Cu(NO_3)_2 \cdot 3H_2O$, $Ce(NO_3)_3 \cdot 6H_2O$ and $ZrOCl_2 \cdot 8H_2O$ were added into the ethanol solution (total moles of precursors should be 0.01 mmol). After stirring for 2 h, completely dissolved transparent coloured sol has been kept in the oven for 48 h at 40° C. for controlled solvent evaporation. After aging the gel product has been kept at 100° C. for 24 h for drying. Finally material has been calcined at 400° C. for 4 h with the ramping rate of 1° C./min to get the desired Cu—Ce—Zr mesoporous mixed oxide. A schematic representation of the above synthesis procedure is given in the flow diagram in FIG. 1.

b. Synthesis of $xAu-Cu_{0.1}Ce_{0.85}Zr_{0.05}O_2$ (x=0.01 to 10)

For the photodeposition of Au nanoparticles, 0.75 g of prepared catalyst was taken in quartz round bottom flask containing 120 mL of methanol and 30 mL of distilled water, calculated amounts of $HAuCl_4 \cdot 3H_2O$ solution was added to make two different compositions (0.1, 0.5, 1 and 3 mol %) of $XAu-Cu_{0.1}Ce_{0.85}Zr_{0.05}O_2$. The prepared mixture was irradiated under UV light (>250 nm) for 2 h; Due to irradiation, $Au^{3+}$ from gold solution reduces to metallic gold and gets deposited on metal oxide support in the form of Au-nanoclusters. After photo deposition the solution is allowed to settle down and then decanted, remaining solution was centrifuged with distilled water and ethanol at 6000 rpm for 10 min. Finally solution was dried at 45° C. for 16 h and at 100° C. for 12 h in an oven.

c. Catalytic Test

CO oxidation catalytic testing has been carried out using fixed bed glass reactor with an outer diameter of 14 mm size. In a typical CO oxidation experiment, 250 mg of Cu—Ce—Zr catalyst has been loaded on the fixed bed reactor and passed by 5% CO containing gas mixture ($CO:O_2$=1:5) diluted with $N_2$. Flow rate of the gas mixture was maintained at 25 ml/min and calculated GHSV was 6000 cm³/g h. Temperature of the reactor was increased at the ramping rate of 2° C./min, and held at different temperature for 10 min for analysis. Composition of the gas was monitored by online GC. CO oxidation catalytic activity was measured from room temperature to 300° C. Rate measurements were carried out under steady state conditions. Catalytic activity was recorded in terms of the % conversion of the CO to $CO_2$ molecule by using the following formula. In order to check the efficacy of the catalysts, high CO content oxidation measurements were also made with the gas mixture composition of $CO:O_2$=1:2 and different GHSV of 12,000 and 18,000.

$$X_{CO} = \left(\frac{P_{CO,in} - P_{CO,out}}{P_{CO,in}}\right) \times 100$$

d. Characterization of Mesoporous $Cu_{0.1}Ce_{0.9-x}Zr_xO_2$ (x=0.05 to 0.85) and its Catalytic Applications

A. XRD

In FIG. 3, LXRD patterns display a Single broad diffraction feature at 2θ=0.5-3 indicates materials are mesoporous in nature.

In FIG. 4, WXRD of Fluorite cubic crystal structure has been observed for all $Cu_{0.1}Ce_{0.85-x}Zr_xO_2$ (x=0.05 to 0.85) materials.

In WXRD, as the zirconia content increases crystallite size also increases.

In WXRD, Shift towards higher 2θ value indicates the incorporation of $ZrO_2$ into lattice of $CeO_2$.

In WXRD, absence of CuO peaks suggests that it could either be incorporated into ceria lattice or highly dispersed nanocrystalline in nature.

B. Raman Analysis: (FIG. 5)

Six Raman-active modes ($A_{1g}+2B_{1g}+3E_g$) are observed for tetragonal-$ZrO_2$, while for cubic $CeO_2$ only $F_{2g}$ mode, centered at around 461 cm⁻¹, was observed.

Shift in the F2g peak towards lower wavenumber is due to incorporation of $Zr^{4+}$ in the Ceria lattice.

C. TPR Analysis: (FIG. 6)

Reduction peak of copper oxide appears ~150° C. for $Cu_{0.1}Ce_{0.85}Zr_{0.05}O_2$ indicates $Cu^{2+}$ is likely incorporated in $CeO_2$ lattice.

CuO reduction peak shifts to high temperature for higher $ZrO_2$ content, and two peaks were observed indicating lower CuO-support interaction D. $N_2$ Adsorption-desorption Isotherms: (FIG. 7)

All materials show type IV isotherms with H2 hysteresis loop indicating mesoporosity.

All materials exhibit narrow pore size distribution in the mesopore range with pore diameter between 4 and 7 nm.

BET surface area observed between 105-146 m²/g.

EXAMPLE 2

Synthesis of $Cu_{0.1}Ce_{0.85}Zr_{0.05}O_2$ Material 1 g of P123 has been dissolved completely in 20 ml of ethanol. Then 0.2416 g of Cu $(NO_3)_2.3H_2O$, 3.691 g of $Ce(NO_3)_3.6H_2O$ and 0.1611 g of $ZrOCl_2.8H_2O$ were added into the ethanol solution. After stirring for 2 h, completely dissolved transparent coloured sol has been kept in the oven for 48 h at 40° C. for controlled solvent evaporation. After aging the gel product has been kept at 100° C. for 24 h for drying. Finally material has been calcined at 400° C. for 4 h with the ramping rate of 1° C./min to get the desired mesoporous $Cu_{0.1}Ce_{0.85}Zr_{0.05}O_2$ mixed oxide.

EXAMPLE 3

Synthesis of $Cu_{0.05}Ce_{0.675}Zr_{0.275}O_2$ Material 1 g of P123 has been dissolved completely in 20 ml of ethanol. Then 0.1208 g of $Cu(NO_3)_2.3H_2O$, 2.931 g of $Ce(NO_3)_3.6H_2O$ and 0.886 g of $ZrOCl_2.8H_2O$ were added into the ethanol solution. After stirring for 2 h, completely dissolved transparent coloured sol has been kept in the oven for 48 h at 40° C. for controlled solvent evaporation. After aging the gel product has been kept at 100° C. for 24 h for drying. Finally material has been calcined at 400° C. for 4 h with the ramping rate of 1° C./min to get the desired mesoporous $Cu_{0.05}Ce_{0.675}Zr_{0.275}O_2$ mixed oxide.

EXAMPLE 4

Synthesis of $Co_{0.1}Ce_{0.25}Zr_{0.65}O_2$ material 1 g of P123 has been dissolved completely in 20 ml of ethanol. Then 0.291 g of $Co(NO_3)_2.6H_2O$, 1.086 g of $Ce(NO_3)_3.6H_2O$ and 2.095 g of $ZrOCl_2.8H_2O$ were added into the ethanol solution. After stirring for 2 h, completely dissolved transparent coloured sol has been kept in the oven for 48 h at 40° C. for controlled solvent evaporation. After aging the gel product has been kept at 100° C. for 24 h for drying. Finally material has been calcined at 400° C. for 4 h with the ramping rate of 1° C./min to get the desired mesoporous $Co_{0.1}Ce_{0.25}Zr_{0.65}O_2$ mixed oxide.

EXAMPLE 5

Synthesis of $Mn_{0.1}Ce_{0.05}Zr_{0.85}O_2$ material 1 g of P123 has been dissolved completely in 20 ml of ethanol. Then 0.179 g of $Mn(NO_3)$, 0.2171 g of $Ce(NO_3)_3.6H_2O$ and 2.7392 g of $ZrOCl_2.8H_2O$ were added into the ethanol solution. After stirring for 2 h, completely dissolved transparent coloured sol has been kept in the oven for 48 h at 40° C. for controlled solvent evaporation. After aging the gel product has been kept at 100° C. for 24 h for drying. Finally material has been calcined at 400° C. for 4 h with the ramping rate of 1° C./min to get the desired mesoporous $Mn_{0.1}Ce_{0.05}Zr_{0.85}O_2$ mixed oxide.

EXAMPLE 6

Synthesis of $0.1Au-Cu_{0.1}Ce_{0.85}Zr_{0.05}O_2$ Material

Initially 0.75 g of prepared catalyst was taken in quartz RB containing 120 mL of methanol. Then 30 mL of distilled water containing 1.85 ml of 0.0025 M $HAuCl_4.3H_2O$ solution was added to make 0.1 mol % of $Au-Cu_{0.1}Ce_{0.85}Zr_{0.05}O_2$ catalyst. The prepared mixture was irradiated under UV light (>250 nm, 400 W) for 2 hrs, during irradiation $Au^{3+}$ from gold solution reduces to metallic gold and gets deposited on metal oxide support in the form of nanoclusters. After photo deposition the solution is allowed to settle down and then decanted, remaining solution was centrifuged with distilled water and ethanol at 6000 rpm for 10 min. Finally solution was dried at 45° C. for 16 h and at 100° C. for 12 h in an oven.

EXAMPLE 7

Synthesis of $0.5Au-Cu_{0.1}Ce_{0.85}Zr_{0.05}O_2$ Material

Initially 0.75 g of prepared catalyst was taken in quartz RB containing 120 mL of methanol. Then 30 mL of distilled water containing 9.5 ml of 0.0025 M $HAuCl_4.3H_2O$ solution was added to make 0.5 mol % of $Au-Cu_{0.1}Ce_{0.85}Zr_{0.05}O_2$ catalyst. The prepared mixture was irradiated under UV light (>250 nm, 400 W) for 2 hrs, during irradiation $Au^{3+}$ from gold solution reduces to metallic gold and gets deposited on metal oxide support in the form of nanoclusters. After photo deposition the solution is allowed to settle down and then decanted, remaining solution was centrifuged with distilled water and ethanol at 6000 rpm for 10 min. Finally solution was dried at 45° C. for 16 h and at 100° C. for 12 h in an oven.

EXAMPLE 8

Synthesis of $1Au-Cu_{0.1}Ce_{0.85}Zr_{0.05}O_2$ Material

Initially 0.75 g of prepared catalyst was taken in quartz RB containing 120 mL of methanol. Then 30 mL of distilled water containing 4.6 ml of 0.01 M $HAuCl_4.3H_2O$ solution was added to make 1 mol % of $Au-Cu_{0.1}Ce_{0.85}Zr_{0.05}O_2$ catalyst. The prepared mixture was irradiated under UV light (>250 nm, 400 W) for 2 hrs, during irradiation $Au^{3+}$ from gold solution reduces to metallic gold and gets deposited on metal oxide support in the form of nanoclusters. After photo deposition the solution is allowed to settle down and then decanted, remaining solution was centrifuged with distilled water and ethanol at 6000 rpm for 10 min. Finally solution was dried at 45° C. for 16 h and at 100° C. for 12 h in an oven.

EXAMPLE 9

Synthesis of $3Au-Cu_{0.1}Ce_{0.85}Zr_{0.05}O_2$ Material

Initially 0.75 g of prepared catalyst was taken in quartz RB containing 120 mL of methanol. Then 30 mL of distilled water containing 13.9 ml of 0.01 M $HAuCl_4.3H_2O$ solution was added to make 3 mol % of $Au-Cu_{0.1}Ce_{0.85}Zr_{0.05}O_2$ catalyst. The prepared mixture was irradiated under UV light (>250 nm, 400 W) for 2 hrs, during irradiation $Au^{3+}$ from gold solution reduces to metallic gold and gets deposited on metal oxide support in the form of nanoclusters. After photo deposition the solution is allowed to settle down and then decanted, remaining solution was centrifuged with distilled water and ethanol at 6000 rpm for 10 min. Finally solution was dried at 45° C. for 16 h and at 100° C. for 12 h in an oven.

EXAMPLE 10

Synthesis of 3Au—Co$_{0.1}$Ce$_{0.85}$Zr$_{0.05}$O$_2$ material

Initially 0.75 g of prepared catalyst was taken in quartz RB containing 120 mL of methanol. Then 30 mL of distilled water containing 13.9 ml of 0.01 M HAuCl$_4$.3H$_2$O solution was added to make 3 mol % of Au—Co$_{0.1}$Ce$_{0.85}$Zr$_{0.05}$O$_2$ catalyst. The prepared mixture was irradiated under UV light (>250 nm, 400 W) for 2 hrs, during irradiation Au$^{3+}$ from gold solution reduces to metallic gold and gets deposited on metal oxide support in the form of nanoclusters. After photo deposition the solution is allowed to settle down and then decanted, remaining solution was centrifuged with distilled water and ethanol at 6000 rpm for 10 min. Finally solution was dried at 45° C. for 16 h and at 100° C. for 12 h in an oven.

EXAMPLE 11

Synthesis of 0.5Au—Mn$_{0.1}$Ce$_{0.85}$Zr$_{0.05}$O$_2$ Material

Initially 0.75 g of prepared catalyst was taken in quartz RB containing 120 mL of methanol. Then 30 mL of distilled water containing 9.5 ml of 0.0025 M HAuCl$_4$.3H$_2$O was added to make 0.5 mol % of Au—Mn$_{0.1}$Ce$_{0.85}$Zr$_{0.05}$O$_2$ catalyst. The prepared mixture was irradiated under UV light (>250 nm, 400 W) for 2 hrs, during irradiation Au$^{3+}$ from gold solution reduces to metallic gold and gets deposited on metal oxide support in the form of nanoclusters. After photo deposition the solution is allowed to settle down and then decanted, remaining solution was centrifuged with distilled water and ethanol at 6000 rpm for 10 min. Finally solution was dried at 45° C. for 16 h and at 100° C. for 12 h in an oven.

EXAMPLE 12 a. Structural and Spectroscopy Characterization

Powder XRD pattern of Ce$_{0.9}$Zr$_{0.1}$O$_2$, Cu$_{0.1}$Ce$_{0.85}$Zr$_{0.05}$O$_2$, 0.1 and 0.6 wt % Au on Cu$_{0.1}$Ce$_{0.85}$Zr$_{0.05}$O$_2$ catalysts are shown in FIG. 19. All diffraction features were indexed with reference to the cubic fluorite crystal structure of ceria (JCPDS 34-0394) and it is in very good agreement. CZ solid solution can exist in three stable phases, namely cubic (c), tetragonal (t), and monoclinic (m), and two metastable (t', t") phases. Broadening of the wide angle x-ray diffraction peaks indicating the nanocrystalline nature of the prepared catalysts. Absence of CuO, Cu$_2$O and gold peaks in the above XRD spectra demonstrates the copper is introduced into the lattice of ceria or present in highly dispersed nanocrystalline or amorphous form. The crystallite size of the prepared catalysts varies with Cu doping and gold deposition. Ce$_{0.9}$Zr$_{0.1}$O$_2$ catalyst shows the crystallite size as 12 nm and Cu$_{0.1}$Ce$_{0.85}$Zr$_{0.05}$O$_2$, catalyst as 9 nm. However, upon gold deposition, crystallite size decreased further and found to be 8 and 5 nm for 0.1 and 0.6 wt % Au on Cu$_{0.1}$Ce$_{0.85}$Zr$_{0.05}$O$_2$, respectively, as shown by a line-broadening in FIG. 19 inset. Indeed, this observation is puzzling, but indicating the possibility of breaking up of crystallites into smaller size.

Figure 20:
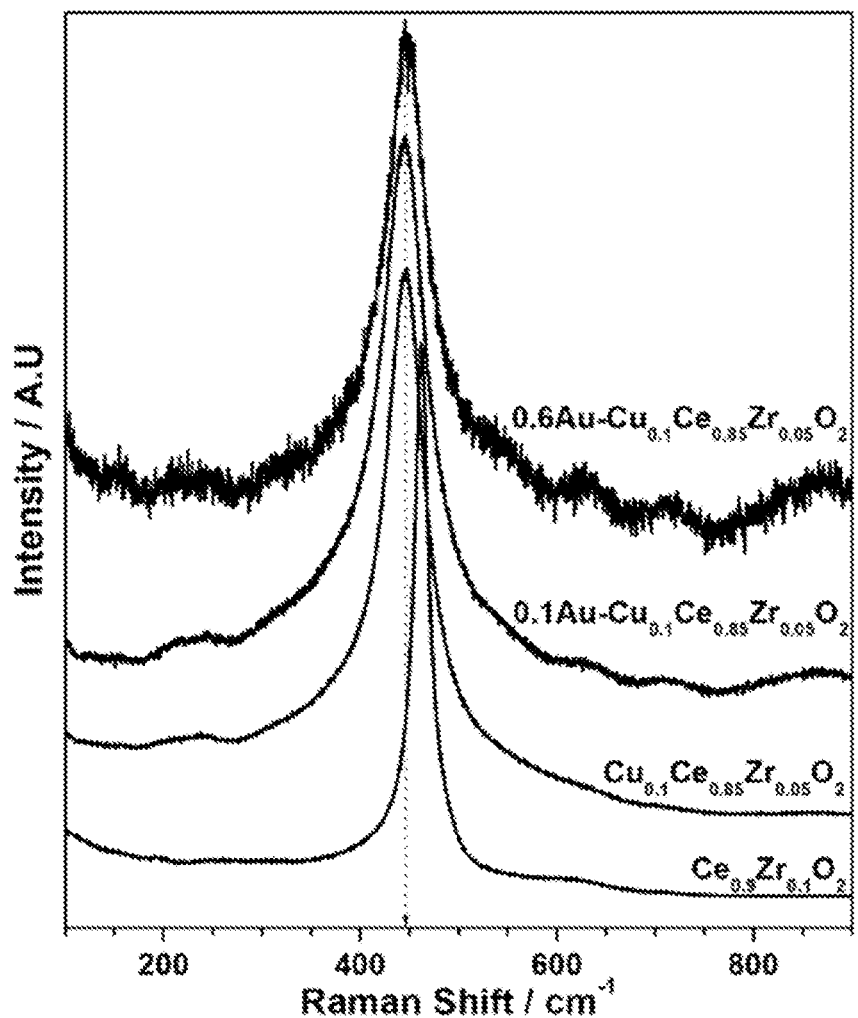
FIG. 20: Raman spectral analysis of $Ce_{0.9}Zr_{0.1}O_2$, $Cu_{0.1}Ce_{0.85}Zr_{0.05}O_2$, 0.1Au—$Cu_{0.1}Ce_{0.85}Zr_{0.05}O_2$, and 0.6Au—$Cu_{0.1}Ce_{0.85}Zr_{0.05}O_2$.

Raman analysis of the catalysts is shown in FIG. 20. Ce$_{0.9}$Zr$_{0.1}$O$_2$ catalyst exhibit a strong characteristic peak at 462 cm$^{-1}$ corresponds to F$_{2g}$ vibration mode of fluorite type structure. Introduction of Cu into CZ lattice broadens and shifts the F$_{2g}$ peak to 445 cm$^{-1}$. Above red shift indicates the changes in electronic interaction possibly due to the incorporation of Cu in CZ lattice. Another possible reason could be due to increased oxygen vacancies, which is related to structural defects derived from partial or total incorporation of copper into CZ solid solution, in agreement with the decrease of lattice parameter. However, no features corresponding to CuO or Cu$_2$O were observed suggesting the absence of crystalline copper oxide; nonetheless, amorphous and/or very small particle size (<2 nm) copper oxide particles cannot be ruled out, which would broaden the corresponding Raman features enormously. Deposition of gold over Cu$_{0.1}$Ce$_{0.85}$Zr$_{0.05}$O$_2$ catalyst marginally shifts F$_{2g}$ peak, but it broadens further. This indicates gold deposition seem to lead a further interaction with Cu-doped CZ. Full width at half maximum (FWHM) of F$_{2g}$ peak of ceria in the mixed oxide can be used to measure the oxygen vacancies in the catalyst. FWHM of F$_{2g}$ feature increases from 20 to 51 on Ce$_{0.9}$Zr$_{0.1}$O$_2$ through Cu$_{0.1}$Ce$_{0.85}$Zr$_{0.05}$O$_2$ to 0.6 wt % Au—Cu$_{0.1}$Ce$_{0.85}$Zr$_{0.05}$O$_2$, respectively. An increasing amount of copper incorporation in CZ lattice along with increasing oxygen vacancies are possible reasons for the above changes in Raman spectra.

Morphology and textural properties of the Cu$_{0.1}$Ce$_{0.85}$Zr$_{0.05}$O$_2$ and Au—Cu$_{0.1}$Ce$_{0.85}$Zr$_{0.05}$O$_2$ catalysts have been studied by HRTEM and the representative results are shown in FIG. 25. Average size of the crystallites was apparently reduced, after deposition of gold over Cu$_{0.1}$Ce$_{0.85}$Zr$_{0.05}$O$_2$ catalyst, and what causes this size reduction is not clear. A disordered mesoporous structure was observed for Cu$_{0.1}$Ce$_{0.85}$Zr$_{0.05}$O$_2$ catalyst. Selected-area electron diffraction (SAED) pattern confirms the crystalline nature of Cu Ce$_{0.85}$Zr$_{0.05}$O$_2$ catalyst (FIG. 25b). HRTEM image shows the majority of lattice fringes corresponding to CZ (111) (d=0.31 nm) facets of cubic fluorite structure. Absence of any lattice fringes corresponding to CuO and Cu$_2$O indicates the total Cu-doping in CZ lattice (Cu$_{0.1}$Ce$_{0.85}$Zr$_{0.05}$O$_2$). These observations are in excellent agreement with XRD and Raman spectral analysis. Disordered mesoporous nature has further advantages like low diffusional barriers, since the depth of mesopores are minimum to a few nanometres, unlike several hundred nanometres in conventional ordered mesoporous materials, like MCM-41 and SBA-15. This disordered pseudo 3D (p3D) mesoporous framework provides an easy route for the diffusion of reactants and products due to low diffusion barriers. In the case of 0.6Au—Cu$_{0.1}$Ce$_{0.85}$Zr$_{0.05}$O$_2$ catalyst also disordered mesoporosity observed. The size of the gold particles has been measured and found to be less than 5 nm (FIG. 25d). However, along with CeO$_2$—ZrO$_2$ (111) lattice, many Au (001) faceted particle (d$_{001}$=2.02 Å) also has been observed. A careful analysis of HRTEM gold clusters on the above catalysts shows the predominantly Au (001) faceted clusters deposited on CeO$_2$—ZrO$_2$ (111) facets leading to a distinct interface. This type of interface is crucial for the transport of atomic oxygen across the interface from CZ to gold, possibly by reverse spill-over mechanism.

Figure 21:
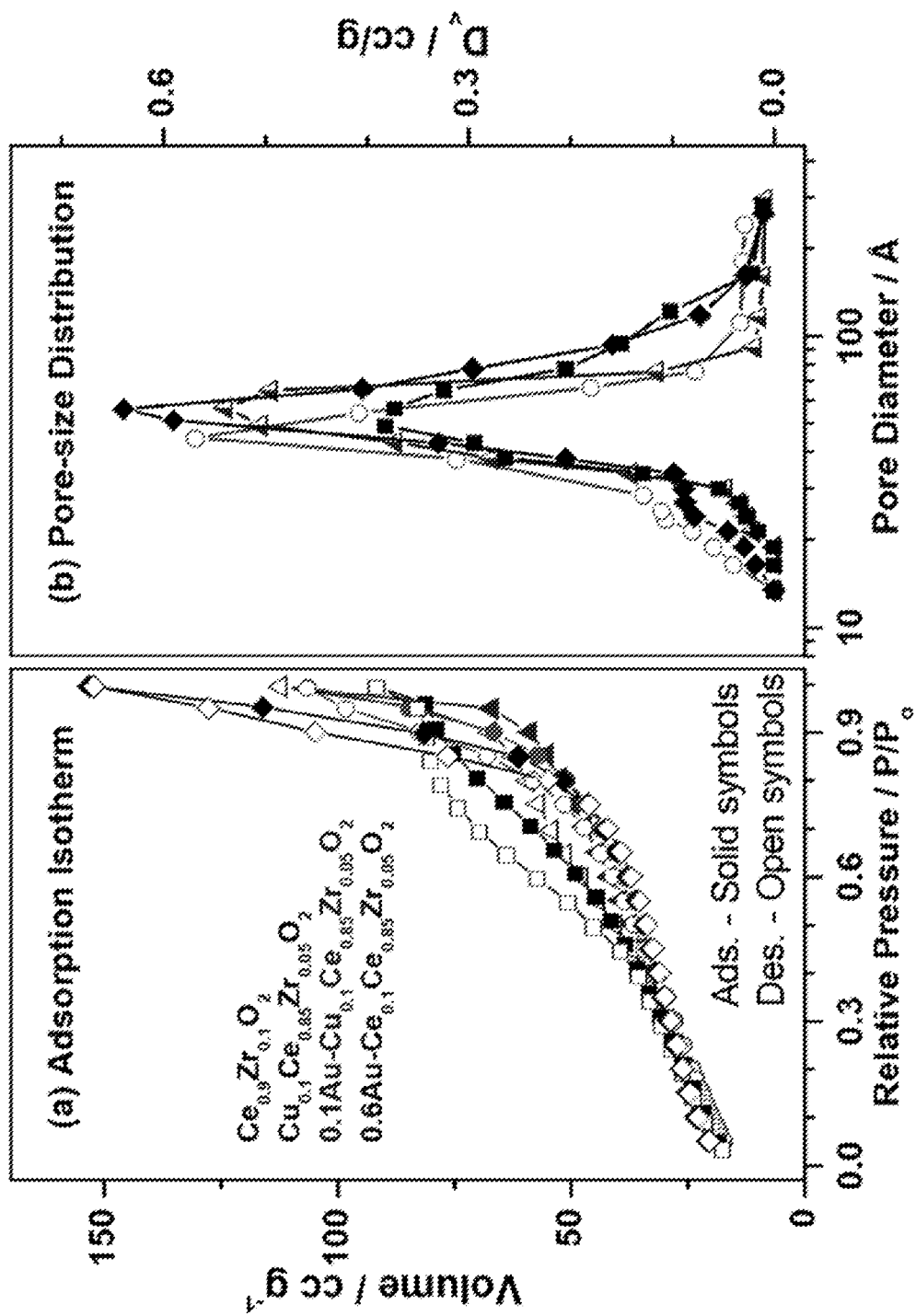
FIG. 21: (a) $N_2$ adsorption-desorption isotherms, and (b) pore size distribution of $Ce_{0.9}Zr_{0.1}O_2$) $Cu_{0.1}Ce_{0.85}Zr_{0.05}O_2$, 0.1Au—$Cu_{0.1}Ce_{0.85}Zr_{0.05}O_2$, and 0.5Au—$Cu_{0.1}Ce_{0.85}Zr_{0.05}O_2$ mesoporous catalysts.
Figure 25A:
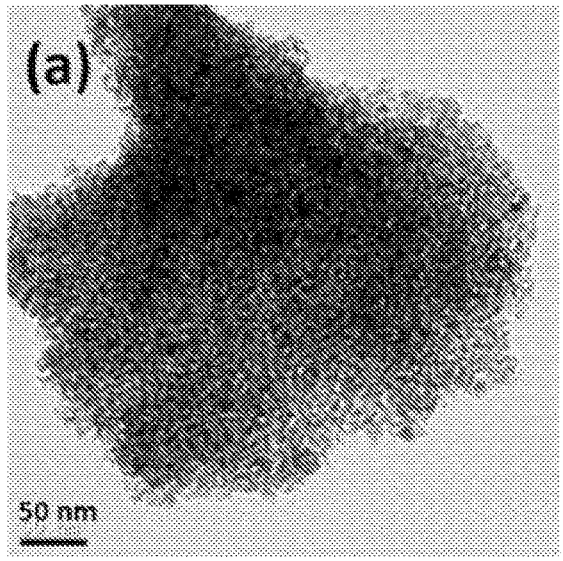
FIG. 25: HRTEM images of mesoporous $Cu_{0.1}Ce_{0.85}Zr_{0.05}O_2$ and Au-$Cu_{0.1}Ce_{0.85}Zr_{0.05}O_2$ catalysts.
Figure 25B:
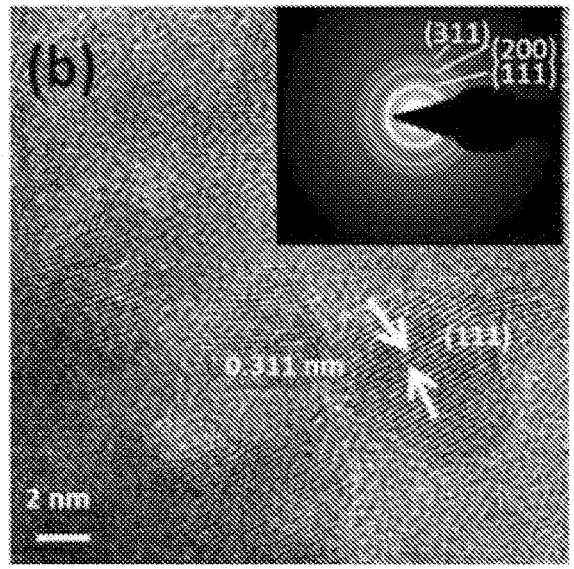
Figure 25C:
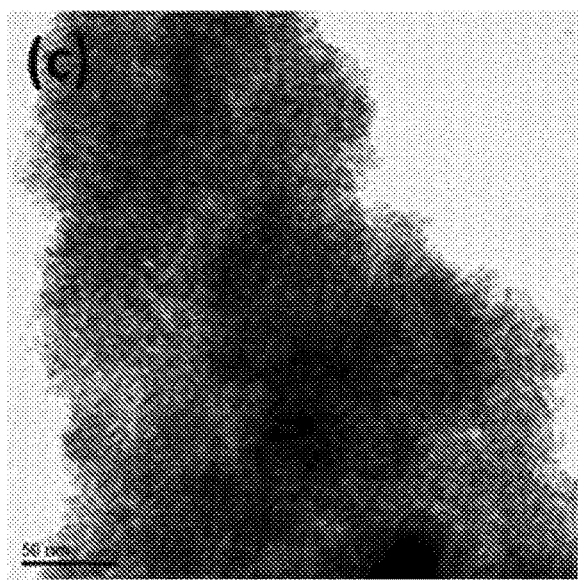
Figure 25D:
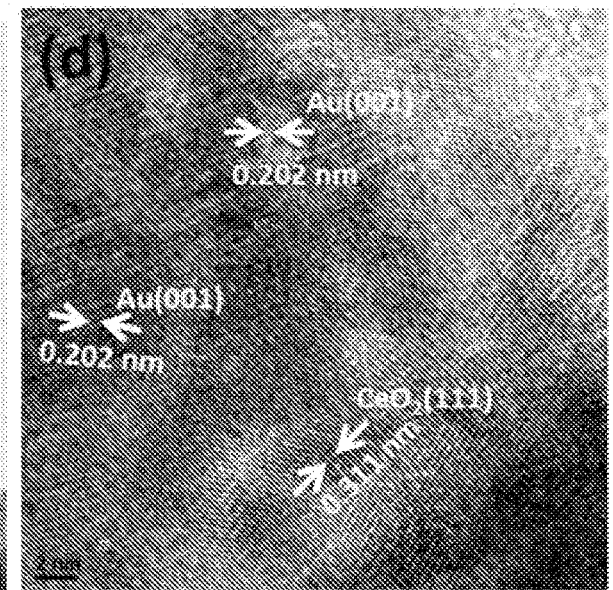

Textural characteristics of CZ based catalysts were measured by N$_2$ adsorption isotherms and pore-size distribution analysis. The results are shown in FIG. 21. The results shows type IV adsorption-desorption isotherm which is typical for mesoporous materials. Ce$_{0.9}$Zr$_{0.1}$O$_2$ catalyst shows H3 type hysteresis loop which does not level off even at the saturation vapour pressure (P=P$_0$). However, all other catalyst shows H2 hysteresis loop. All the catalysts show narrow pore size distribution. BET surface area of all materials were calculated. Surface area decreases from 140 to 132 m$^2$/g after the doping with copper in Ce$_{0.9}$Zr$_{0.1}$O$_2$ catalyst. Further the surface area decreases to 96 and 87 m$^2$/g for 0.1Au—$Cu_{0.1}Ce_{0.85}Zr_{0.05}O_2$ and 0.6Au—$Cu_{0.1}Ce_{0.85}Zr_{0.05}O_2$, respectively, Decrease in the surface area of the catalyst at the expense of lower crystallite size could be due to pore blockage by gold clusters. Unimodel pore size distribution was observed with an average pore diameter around 5±1 nm for all catalysts. The TPR profiles of $Cu_{0.1}Ce_{0.85}Zr_{0.05}O_2$, and Au—$Cu_{0.1}Ce_{0.85}Zr_{0.05}O_2$ catalysts are shown in FIG. 23. Zirconia could not be reduced in $H_2$ up to 900° C. According to various literature reports pure ceria shows two peaks around 500 and 800° C. corresponds to the reduction of surface and bulk species, respectively. Reducibility of ceria increased in the presence of $Zr^{4+}$ and thereby reduction temperature has decreased further. However, $Cu_{0.1}Ce_{0.85}Zr_{0.05}O_2$ shows two strong Cu-reduction peaks at 168 and 248° C. Literature reports suggests that both copper reduction peaks in CZ lattice occur at lower temperatures than pure CuO' A careful analysis reveals a decreasing onset of first reduction peak from 110° C. on $Cu_{0.1}Ce_{0.85}Zr_{0.05}O_2$, to 65 and 48° C., respectively with 0.1 and 0.6 wt % Au (FIG. 22) demonstrates the Cu-reducibility increases in the above order; this also underscores an easily reducible character of copper due to gold deposition. This could be due to the synergistic electronic interaction between copper and CZ. Low temperature copper reduction peak is attributed to Cu introduced in the CZ lattice, which are believed to be active sites for CO oxidation. The high temperature copper reduction peak is attributed to the CuO species interacting with the CZ support. TPR results suggests the lattice doping of majority of $Cu^{2+}$ in CZ lattice and in good agreement with spectral and structural analysis results.

Electronic structure of the catalyst was analysed by XPS and the results are shown in FIG. 23. Ce 3d spectrum of virgin and gold deposited $Cu_{0.1}Ce_{0.85}Zr_{0.05}O_2$ catalysts (FIG. 23a) exhibits characteristic features of $Ce^{4+}$. All peaks, except v' (885.7 eV) and u' (904.2 eV), correspond to $Ce^{4+}$ oxidation state; however, reduction in intensity of high BE peak at 917 eV (u''') demonstrates an increasing amount of $Ce^{3+}$. v' and u' features are characteristic of $Ce^{3+}$ oxidation state, and corresponds to the Ce(III) $3d^94f^2$-O $2p^5$ configuration. A careful analysis of the Ce 3d spectra reveals the following point: A decrease in intensity, FWHM as well as area of u''' feature with increasing Au-content underscores a relatively increasing amount of $Ce^{3+}$ from $Cu_{0.1}Ce_{0.85}Zr_{0.05}O_2$ to 0.6Au—$Cu_{0.1}Ce_{0.85}Zr_{0.05}O_2$. This is further supported by increasing intensity of other $Ce^{3+}$ features (v' and u') (dashed lines). Above points directly suggests an electronic interaction between Cu and nano Au-clusters with ceria-zirconia lattice, especially to increase the $Ce^{3+}$ content. Cu 2p XPS results are shown in FIG. 23b for virgin and Au-deposited $Cu_{0.1}Ce_{0.85}Zr_{0.05}O_2$ catalysts. Cu $2p_{3/2}$ core level shows predominant $Cu^+$ (932.2±0.1 eV) and some $Cu^{2+}$ (934.2 eV) oxidation state on $Cu_{0.1}Ce_{0.85}Zr_{0.05}O_2$. Presence of $Cu^{2+}$ state is confirmed from the observation of satellite features around 940 eV. The formation of $Cu^+$ species may result from a strong interaction of Cu with the high-surface area CZ support. However, on 0.1Au-deposition, $Cu^{2+}$ features disappears and only $Cu^+$ feature is observed at 932 eV. On increasing the gold deposition to 0.6 wt %, small amount of $Cu^+$ was observed and the low S/N level hints the masking of Cu, possibly by gold. Inset in FIG. 23b shows the Au 4f core level spectra from 0.6Au—$Cu_{0.1}Ce_{0.85}Zr_{0.05}O_2$. Au $4f_{7/2}$ core level appears at a BE=83 eV. It is well known that metallic gold BE appears at 84 eV for Au $4f_{7/2}$ core level. Even though gold content is not high and it is observed as nanoclusters in HRTEM, observation of Au 4f level hints the possibility of gold deposition preferably on Cu-sites. Nano gold clusters prefer to deposit on the oxygen vacancies of Cu—Ce—Zr (111) plane and involves the formation of anionic gold $Au^{\delta-}$. It is very likely that lower coordination number Au atoms on nano gold surfaces deposited on oxygen vacancy sites of CZ enhances the electron transfer from the latter to Au; this makes the electron density higher on gold and apparently Au behaves like anionic gold. Ionic radii consideration ($Ce^{4+}$ (1.01 Å), $Ce^{3+}$ (1.15 Å), $Cu^+$ (0.91 Å), $Cu^{2+}$ (0.87 Å), $Zr^{4+}$ (0.86 Å), $O^{2-}$ (1.26 Å)) suggests the possibility of Cu-doping near Zr-sites to minimize the lattice distortion; however, this would also induce more oxygen vacancies ($O_v$) and hence more $Ce^{3+}$, which make the composite redox mechanism enabled at ambient conditions, and required for oxidation reactions. We also suggest $Zr^{4+}$—O—$Cu^+$—$O_v$-$Ce^{3+}$— linkages could be available predominantly. Gold deposition on such Cu-sites might be a reason for decrease in the intensity of Cu 2p features on Au—$Cu_{0.1}Ce_{0.85}Zr_{0.05}O_2$. Importantly, this would generate an interface, where all metal ions are present in close proximity to help for various elementary steps of catalysis reaction to occur in a tandem manner. XPS spectra for O 1s core level shows a main peak centred at 529.5±0.1 eV for $Cu_{0.1}Ce_{0.85}Zr_{0.05}O_2$ and gold deposited catalysts. A distinct shoulder feature was observed at 531.5 eV on gold-deposited catalysts is attributed to hydroxyl features. (FIG. 23)

b. Activity Results

FIG. 24 shows the catalytic performance of $Ce_{0.9}Zr_{0.1}O_2$, $Cu_{0.1}Ce_{0.85}Zr_{0.05}O_2$, 0.1Au—$Cu_{0.1}Ce_{0.85}Zr_{0.05}O_2$, and 0.6Au—$Cu_{0.1}Ce_{0.85}Zr_{0.05}O_2$ for CO oxidation. 0.6Au—$Ce_{0.9}Zr_{0.1}O_2$ was also evaluated for comparison, especially to underscore the role of Cu. Among all the catalysts, $Ce_{0.9}Zr_{0.1}O_2$ catalyst shows the lowest oxidation activity with activity onset at 240° C. and 17% CO conversion at 300° C. A quantum jump in the CO oxidation catalytic activity of $Cu_{0.1}Ce_{0.85}Zr_{0.05}O_2$ catalyst is evident from T100 (T50) value 120° C. (77° C.) than that of $Ce_{0.9}Zr_{0.1}O_2$. It is also to be emphasized that the onset of CO oxidation begins at ambient temperatures. Higher activity of $Cu_{0.1}Ce_{0.85}Zr_{0.05}O_2$ catalyst could be due to the presence of active copper species near the $O_v$ sites of CZ present in the catalyst for CO oxidation. Although not shown in FIG. 24, by varying Cu and Zr-contents in the $Cu_{0.1}Ce_{0.85}Zr_{0.05}O_2$ catalyst, onset of oxidation activity could be systematically brought down to ambient temperatures.

Gold deposited catalysts (Au—$Cu_{0.1}Ce_{0.85}Zr_{0.05}O_2$) were evaluated for CO oxidation catalysis. Onset of oxidation catalysis begins at ambient temperatures and a steep rise in CO oxidation activity can be witnessed in FIG. 24 for 0.1Au and 0.6Au containing catalysts with 100 (50) % CO conversion temperatures are at 65 (48° C. and 47 (36° C., respectively. As in the earlier case, CO oxidation activity onset can be tuned by varying the gold content from 0 to 0.6 wt %. However, further increase in gold content to 1 wt % increases the CO oxidation onset temperature. 0.6Au—$Ce_{0.9}Zr_{0.1}O_2$ catalyst shows a different trend in activity. Although ambient temperature activity was observed, like the above catalysts, only 30% CO conversion was observed; 100% (50%) CO conversion was observed at rather 285 (210° C. very high temperatures. Above observation underscores the role of Cu, and hence $O_v$, in bringing down 100% CO conversion temperature and its part in facilitating the same in Au—$Cu_{0.1}Ce_{0.85}Zr_{0.05}O_2$.

Recyclability of the 0.6 wt % Au—$Cu_{0.1}Ce_{0.85}Zr_{0.05}O_2$ catalyst was tested for five cycles by simply cooling down the reactor temperature after each reaction to a maximum temperature of 150° C. and without any further treatment (see FIG. 18). Catalyst was held at 150° C. for 60 min at the end of each cycle. Very similar CO oxidation catalytic activity was observed without any significant difference in the activity in each cycle implies the efficacy of the mesoporous catalysts. It also underscores that the catalysts does not undergo any structural or microstructural changes during the repeated activity evaluation.

Advantages of Invention a. Carbon monoxide (CO) oxidation can be performed from near room temperatures to high temperatures by varying the composition of Au deposited $Cu_{0.1}Ce_{0.85}Zr_{0.05}$ catalysts.
b. Novel material with sustainable reaction under variety of $CO:O_2$ ratios, temperature and space velocity conditions.
c. The mesoporous channels allow high volume of gases and gold allows near room temperature CO oxidation.
d. Easily recyclable

The invention claimed is:
1. A mesoporous gold deposited oxidation catalyst of formula Au-$M_{0.1}Ce_{0.85}Zr_{0.05}O_2$, characterized in that gold deposited on the catalyst is in the form of nanoscale particles and the mesoporous gold deposited oxidation catalyst has between 0.01-10 atomic wt % of gold, wherein
M is selected from Cu, Co or Mn and
the catalyst is a crystalline compound exhibiting a fluorite cubic crystal lattice structure, and M is doped in the lattice.
2. The mesoporous gold deposited oxidation catalyst according to claim 1, wherein the gold deposited on the catalyst is in the range of 0.1-3 atomic wt % of gold.
3. A process for the preparation of mesoporous gold deposited oxidation catalyst according to claim 1, comprising the steps of:
a) adding $M(NO_3)_2.3H_2O$, $Ce(NO_3)_3.6H_2O$ and $ZrOCl_2.8H_2O$ into the ethanol solution of triblock copolymer (P-123) with stirring for period in the range of 30 minutes to 2 hours to obtain transparent coloured sol;
b) aging the transparent coloured sol for period in the range of 46 to 48 hours at temperature in the range of 40 to 45° C.;
c) drying the aged sol as obtained in step (b) at temperature in the range of 90 to 110° C. for period in the range of 20 to 24 hours followed by calcining at temperature in the range of 350 to 400° C. for period in the range of 2 to 4 hours with the ramping rate of 1° C./min to get the $M_{0.1}Ce_{0.85}Zr_{0.05}O_2$ mesoporous mixed oxide;
d) adding water containing $HAuCl_4.3H_2O$ solution into methanolic solution of $M_{0.1}Ce_{0.85}Zr_{0.05}O_2$ mesoporous mixed oxide as obtained in step (c);
e) irradiating the reaction mixture of step (d) under UV light for period in the range of 30 minutes to 2 hours and the solution is allowed to settle down and then decanted;
f) centrifuging the remaining solution of step (e) with water and ethanol at speed in the range of 4000 to 6000 rotations per minute (rpm) for period in the range of 8 to 10 minutes followed by drying to obtain mesoporous gold deposited oxidation catalyst.
4. The process as claimed in claim 3, wherein drying in step (c) is carried out at temperature in the range of 90 to 110° C. for period in the range of 20 to 24 hours.
5. The process as claimed in claim 3, wherein drying in step (f) is carried out at temperature in the range of 40 to 45° C. for period in the range of 8 to 16 hours and at temperature in the range of 80 to 100° C. for period in the range of 8 to 12 hours.
6. The mesoporous gold deposited oxidation catalyst according to claim 1, wherein said catalyst is useful for oxidation of CO.
7. The mesoporous gold deposited oxidation catalyst according to claim 6, wherein said catalyst exhibit CO conversion efficiency in the range of 50 to 100% between 35 and 69° C.
8. The mesoporous gold deposited oxidation catalyst according to claim 1, wherein the mesoporous gold deposited oxidation catalyst has pore diameters ranging from 37.8 to 51.0 Å.
9. The mesoporous gold deposited oxidation catalyst according to claim 1, wherein the mesoporous gold deposited oxidation catalyst has pore diameters ranging from 4 to 7 nm.
10. The mesoporous gold deposited oxidation catalyst according to claim 1, wherein the mesoporous gold deposited oxidation catalyst has a unimodal pore size distribution.
11. The mesoporous gold deposited oxidation catalyst according to claim 1, wherein the mesoporous gold deposited oxidation catalyst is Au—$Cu_{0.1}Ce_{0.85}Zr_{0.05}O_2$ with 0.1 atomic wt % of gold.
12. The mesoporous gold deposited oxidation catalyst according to claim 1, wherein the mesoporous gold deposited oxidation catalyst is Au—$Cu_{0.1}Ce_{0.85}Zr_{0.05}O_2$ with 0.6 atomic wt % of gold.
13. The mesoporous gold deposited oxidation catalyst according to claim 1, wherein the gold particles are less than 5 nm in size.
14. The process as claimed in claim 3, wherein the obtained mesoporous gold deposited oxidation catalyst has pore diameters ranging from 37.8 to 51.0 Å.
15. The process as claimed in claim 3, wherein the obtained mesoporous gold deposited oxidation catalyst has pore diameters ranging from 4 to 7 nm.
16. The process as claimed in claim 3, wherein the mesoporous gold deposited oxidation catalyst has a unimodal pore size distribution.
17. A mesoporous oxidation catalyst of formula Au—$M_{0.1}Ce_{0.85}Zr_{0.05}O_2$, wherein
M is selected from Cu, Co or Mn;
the gold is deposited on the $M_{0.1}Ce_{0.85}Zr_{0.05}O_2$ in the form of nanoscale particles;
the oxidation catalyst has between 0.01-10 atomic wt % of gold;
the oxidation catalyst exhibits a type IV $N_2(g)$ adsorption-desorption isotherm;
the catalyst is a crystalline compound exhibiting a fluorite cubic crystal lattice structure; and
M is doped in the lattice.

* * * * *